US012669326B2

(12) United States Patent　　　(10) Patent No.:　US 12,669,326 B2

Oshima　　　(45) Date of Patent:　Jun. 30, 2026

(54) THREAD SHAPE DIMENSION MEASURING DEVICE AND THREAD SHAPE DIMENSION MEASURING METHOD

(71) Applicant: NIPPON STEEL CORPORATION, Chiyoda-ku (JP)

(72) Inventor: Shinichi Oshima, Chiyoda-ku (JP)

(73) Assignee: NIPPON STEEL CORPORATION, Tokyo (JP)

( * ) Notice: Subject to any disclaimer, the term of this patent is extended or adjusted under 35 U.S.C. 154(b) by 197 days.

(21) Appl. No.: 18/682,028

(22) PCT Filed: Mar. 27, 2023

(86) PCT No.: PCT/JP2023/012086

§ 371 (c)(1),
(2) Date: Feb. 7, 2024

(87) PCT Pub. No.: WO2023/228543

PCT Pub. Date: Nov. 30, 2023

(65) Prior Publication Data

US 2024/0418502 A1　　Dec. 19, 2024

(30) Foreign Application Priority Data

May 24, 2022　(JP) ................................. 2022-084821

(51) Int. Cl.
*G01B 11/24*　(2006.01)

(52) U.S. Cl.
CPC ................................. *G01B 11/2425* (2013.01)

(58) Field of Classification Search
CPC .............. G01B 11/2425; G01B 21/042; G01B 11/2433
See application file for complete search history.

(56) References Cited

U.S. PATENT DOCUMENTS 5,521,707 A * 5/1996 Castore .............. G01B 11/2425
356/602
9,897,437 B2 * 2/2018 Yamaguchi .............. H04N 7/18
(Continued)

FOREIGN PATENT DOCUMENTS

| JP | 2019128203 A | 8/2019 | |
|----|----|----|----|
| JP | 6604258 B2 * | 11/2019 | ............. G01B 11/24 |
| JP | 6849149 B2 | 3/2021 | |

*Primary Examiner* — Tarifur R Chowdhury
*Assistant Examiner* — Joshua M Carlson
(74) *Attorney, Agent, or Firm* — Greer, Burns & Crain, Ltd.

(57) ABSTRACT

This thread shape dimension measuring device includes an illumination unit, an imaging unit, a focal distance adjustment unit, a calibration value setting unit, and a control unit. The illumination unit selectively emits parallel light in two directions. The imaging unit selectively performs capturing of a first captured image and a second captured image. The focal distance adjustment unit adjusts a focusing position of the imaging unit by receiving an adjustment instruction from the control unit. The calibration value setting unit has a difference value between a focal distance of the second captured image from a focusing position to the imaging unit before the focusing position adjustment and a focal distance of the first captured image from a focusing position to the imaging unit. The control unit calculates the thread shape dimension on the basis of the captured first captured image and the second captured image.

2 Claims, 16 Drawing Sheets

(56)     References Cited

U.S. PATENT DOCUMENTS

| 2009/0100900 | A1* | 4/2009 | Spalding | ............ | G01B 11/2504 |
| | | | | | 73/1.81 |
| 2011/0164244 | A1* | 7/2011 | Honda | ................... | G01B 5/163 |
| | | | | | 356/72 |
| 2011/0293169 | A1* | 12/2011 | Bonadeo | ............ | G01B 11/2425 |
| | | | | | 382/152 |
| 2016/0025644 | A1* | 1/2016 | Nygaard | ............ | G01B 11/2433 |
| | | | | | 356/426 |
| 2017/0307541 | A1* | 10/2017 | Offenborn | ............... | B07C 5/342 |
| 2019/0137264 | A1* | 5/2019 | Sauerland | .......... | G01B 11/2425 |
| 2021/0041228 | A1* | 2/2021 | Honda | .............. | G01B 11/2425 |

* cited by examiner

FIG. 7

INTERFERENCE FRINGE

P1

BACKGROUND (TRANSMITTED LIGHT)

SHADOW OF THREADED PIPE

(END PORTION SIDE)                    (CENTRAL PORTION SIDE)

POSITION IN PIPE AXIS DIRECTION[mm]

(END PORTION SIDE)                    (CENTRAL PORTION SIDE)

POSITION IN PIPE AXIS DIRECTION[mm]

(END PORTION SIDE)                    (CENTRAL PORTION SIDE)

POSITION IN PIPE AXIS DIRECTION[mm]

THREAD SHAPE DIMENSION MEASURING DEVICE AND THREAD SHAPE DIMENSION MEASURING METHOD

TECHNICAL FIELD

The present invention relates to a thread shape dimension measuring device and a thread shape dimension measuring method for measuring a thread shape dimension of a threaded pipe having a threaded portion formed at an end portion such as an oil well pipe. Particularly, the present invention relates to a thread shape dimension measuring device and a thread shape dimension measuring method for a threaded pipe capable of measuring shape dimensions of both flank surfaces of the threaded pipe on which a pair of flank surfaces defining each thread ridge of a threaded portion are both formed in an overhanging manner.

Priority is claimed on Japanese Patent Application No. 2022-084821 filed on May 24, 2022, the content of which is incorporated herein by reference.

BACKGROUND ART

Conventionally, as a method of connecting end portions of pipes such as an oil well pipe, a method of connecting end portions of a pair of pipes by preparing a threaded pipe having a threaded portion (male threaded portion) formed on an outer circumferential surface of an end portion of the pipe, and fastening each threaded portion (male threaded portion) of a pair of threaded pipes to a joint having a threaded portion (female threaded portion) formed on an inner circumferential surface has been used.

A high joint strength is required for a threaded portion formed at an end portion of a threaded pipe, but particularly in a case of an oil well pipe, requirements for a dimensional accuracy and a quality assurance level of the threaded portion have become stricter year by year as oil well environments have become harsher in recent years.

Therefore, various devices that automatically measure a thread shape dimension of a threaded portion using a so-called light projection method have been proposed (for example, see Patent Document 1).

In the light projection method, an end portion of a threaded pipe is illuminated by emitting light from an illumination unit, which has an optical axis in a direction orthogonal to a cross section including a pipe axis of the threaded pipe, to the end portion of the threaded pipe. Also, an imaging unit disposed to face the illumination unit with the end portion of the threaded pipe interposed therebetween and having a visual axis in a direction orthogonal to the cross section generates a captured image of the end portion of the threaded pipe by detecting and imaging light that has passed through without being obstructed by the end portion of the threaded pipe. Then, the thread shape dimension of the threaded portion in the cross section is measured on the basis of the captured image.

Here, as oil well environments have become harsher in recent years, there are threaded pipes used as an oil well pipe having a pair of flank surfaces, which define each thread ridge of the threaded portion, formed in an overhanging manner.

FIGS. 1 and 2 are cross-sectional views schematically illustrating an example of an end portion shape of a threaded pipe on which a pair of flank surfaces are both formed in an overhanging manner. FIG. 1 illustrates a cross-sectional view on one side in a radial direction of the end portion of the threaded pipe (a cross-sectional view taken along a cross section including a pipe axis AX). FIG. 2 illustrates an enlarged view of a part A of a threaded portion PS illustrated in FIG. 1.

As illustrated in FIG. 1, the threaded pipe P has a main body PB, the threaded portion PS on which a thread ridge P1 and a thread groove P2 are formed, and a lip portion PL adjacent to the threaded portion PS in order from a central portion side in a longitudinal direction on an outer circumferential surface of the end portion.

Then, as illustrated in FIG. 2, a pair of flank surfaces P3 (surfaces positioned between a top surface P11 of the thread ridge P1 and a bottom surface P21 of the thread groove P2) that define each thread ridge P1 of the threaded portion are both formed in an overhanging manner. That is, the flank surface P3 (P3a) positioned on the end portion side of the threaded pipe P is inclined so that it is positioned increasingly further toward the central portion side of the threaded pipe P from the top surface P11 of the thread ridge P1 toward the bottom surface P21 of the thread groove P2. Also, the flank surface P3 (P3b) positioned on the central portion side of the threaded pipe P is inclined so that it is positioned increasingly further toward the end portion side of the threaded pipe P from the top surface P11 of the thread ridge P1 toward the bottom surface P21 of the thread groove P2. The flank surface P3 formed in an overhanging manner in this way may be referred to as a hook-shaped flank surface.

Further, in FIGS. 1 and 2, when viewed from a line-of-sight direction perpendicular to the paper surface, for the flank surface P3a, only a contour line (ridge line) of a cross section thereof is visible, and a surface continuous with the contour line is hidden on a side behind the paper surface and cannot be seen. On the other hand, for the flank surface P3b, a contour line (ridge line) thereof and a surface continuous with the contour line are also visible. Therefore, in FIGS. 1 and 2, the flank surface P3a is seen as a "line" and the flank surface P3b is seen as a "substantially triangular surface". The same applies to FIG. 11 which will be described later.

In a case of the threaded pipe as illustrated in FIGS. 1 and 2, in the light projection method, the flank surface P3 (hook-shaped flank surface) is hidden behind the shadow of the ridge line of the thread ridge P1, and therefore the entire shape dimension of the flank surface P3 cannot be measured.

Therefore, Patent Document 2 proposes measuring a shape dimension of the flank surface P3 by a method referred to in the present specification as a "focus method".

The focus method is a method of calculating a shape dimension of the flank surface P3 by utilizing the fact that a captured image with a grayscale pattern such as interference fringes formed in a pixel region corresponding to the flank surface P3 is generated when an imaging unit having a visual axis in a direction orthogonal to a cross section including a pipe axis is disposed so that a focusing position (focal position) thereof matches the cross section while an optical axis of an illumination unit is inclined from a direction orthogonal to the cross section using the same optical system as that of the light projection method, and extracting the pixel region with the grayscale pattern such as interference fringes in the captured image.

CITATION LIST

Patent Document

Patent Document 1

Japanese Unexamined Patent Application, First Publication No. 2019-128203

Patent Document 2

Japanese Patent No. 6849149

3

SUMMARY OF THE INVENTION

Problems to be Solved by the Invention

According to the focus method, as described in Patent Document 2, even if one of the pair of flank surfaces P3 is a hook-shaped flank surface, a shape dimension of the flank surface P3 can be measured without a problem.

However, according to the study conducted by the present inventor, it was found that, when both the pair of flank surfaces P3 are hook-shaped flank surfaces as illustrated in FIG. 2, if shape dimensions of both the flank surfaces P3 are measured by the focus method while a position of the imaging unit (position in a visual axis direction) is fixed without changing, a position of one of the flank surfaces P3 is measured to be deviated in a pipe axis direction. If only the position of the flank surface P3 is measured with a deviation (the measured position of flank surface P3 moves in parallel in the pipe axis direction), it will not affect a measured value of an angle of the flank surface P3, but there is a problem in that an error will occur in the measured value of the thread shape such as a thread ridge width w1 and a thread root width w2 calculated according to positions of both the flank surfaces P3.

As described above, when both sides of the pair of flank surfaces P3 are hook-shaped flank surfaces (inverse surfaces forming negative angles α and β with respect to cross sections N1 and N2 (see FIG. 2) perpendicular to a direction of a pipe axis AX), focusing of the reflected light between the flank surfaces P3 alone will result in a state in which one position in the direction of the pipe axis AX is correct but the other is deviated. Therefore, a shape dimension of the flank surface P3 that is deviated in position cannot be accurately obtained, and a pitch between the flank surfaces P3 is also not accurate.

The present invention has been made to solve the problems of the above-described related art, and an objective of the present invention is to provide a thread shape dimension measuring device and a thread shape dimension measuring method capable of measuring a shape dimension of a flank surface of a threaded pipe on which a pair of flank surfaces defining each thread ridge of a threaded portion are both formed in an overhanging manner.

Means for Solving the Problem

In order to solve the above-described problem, the present inventors have conducted intensive studies to see if it is possible to accurately measure shape dimensions of both the pair of flank surfaces (hook-shaped flank surfaces) by improving the focus method.

As a result, it has been found that shape dimensions of both the pair of flank surfaces can be accurately calculated without a position of a second flank surface being calculated to be deviated in a pipe axis direction, by calculating a shape dimension of a first flank surface on the basis of a captured image generated by an imaging unit that is in a state (first state) in which a focusing position matches a position of the first flank surface (a position on a cross section including the pipe axis) similarly to the conventional focus method when a shape dimension of a flank surface on a side facing the imaging unit (the first flank surface that can be directly imaged by the imaging unit) is measured due to a lead angle of a threaded portion among the pair of flank surfaces, and calculating a shape dimension of the second flank surface on the basis of a captured image generated by the imaging unit that is in a state (second state) in which a focusing position matches a position of the second flank surface (a position on a cross section including the pipe axis) by, for example, bringing the position of the imaging unit closer to the threaded pipe by a predetermined distance than that in the first state when a shape dimension of a flank surface on a side opposite to the side facing the imaging unit (the second flank surface that cannot be directly imaged by the imaging unit) is measured.

The present invention has been completed on the basis of the above-described findings of the inventor.

That is, in order to solve the above-described problems, the present invention employs the following aspects.

(1) One aspect of the present invention is a thread shape dimension measuring device which measures a thread shape dimension of a threaded portion in a threaded pipe having the threaded portion formed at an end portion and on which a pair of flank surfaces defining each thread ridge of the threaded portion are both formed in an overhanging manner in a view seen in a cross section including a pipe axis, and the thread shape dimension measuring device includes an illumination unit, an imaging unit, a focal distance adjustment unit, a calibration value setting unit, and a control unit, in which the illumination unit is disposed to face the imaging unit, and selectively emits parallel light in two directions including a first illumination direction, which is one direction, and a second illumination direction, which is another direction, with a direction in which the imaging unit is seen from the illumination unit interposed therebetween, the imaging unit selectively performs capturing of a first captured image by receiving the parallel light from the first illumination direction and capturing of a second captured image by receiving the parallel light from the second illumination direction, the focal distance adjustment unit adjusts a focusing position of the imaging unit by receiving an adjustment instruction from the control unit, the calibration value setting unit has a difference value between a focal distance of the second captured image from the focusing position to the imaging unit before the focusing position adjustment and a focal distance of the first captured image from the focusing position to the imaging unit, and the control unit acquires the difference value from the calibration value setting unit, gives the adjustment instruction to bring the focusing position closer to the illumination unit by the difference value to the focal distance adjustment unit when the second captured image is captured, and calculates the thread shape dimension on the basis of the captured first captured image and the second captured image.

(2) The aspect (1) described above may also be configured as follows:

The calibration value setting unit obtains the difference value on the basis of an amount of deviation between the focusing position of the second captured image before the focusing position adjustment and a true focusing position in a direction orthogonal to a direction of connection between the illumination unit and the imaging unit.

(3) Another aspect of the present invention is a thread shape dimension measuring method for measuring a thread shape dimension of a threaded portion in a threaded pipe having the threaded portion formed at an end portion and on which a pair of flank surfaces defining each thread ridge of the threaded portion are both formed in an overhanging manner in a view seen in a cross section including a pipe axis, and the thread shape dimension measuring method includes a first illumination step of illuminating the end portion by emitting parallel light in a first illumination direction inclined in a direction forming an angle larger than a lead angle of the threaded portion with respect to a direction orthogonal to the cross section including the pipe axis, a second illumination step of illuminating the end portion by emitting parallel light in a second illumination direction inclined to a side opposite to the lead angle of the threaded portion with respect to a direction orthogonal to the cross section including the pipe axis, an imaging step of, in an imaging side facing an emitting source of the parallel light with the end portion interposed therebetween, capturing a first captured image of the end portion by receiving light that has passed between thread ridges of the threaded portion from the parallel light emitted in the first illumination direction, and capturing a second captured image of the end portion by receiving light that has passed between thread ridges of the threaded portion from the parallel light emitted in the second illumination direction, and an arithmetic processing step of calculating the thread shape dimension of the threaded portion on the basis of the first captured image and the second captured image, in which when one of the pair of flank surfaces whose portion on a cross section including the pipe axis is able to be directly imaged from the imaging side is defined as a first flank surface, and one thereof whose portion on the cross section including the pipe axis is not able to be directly imaged from the imaging side is defined as a second flank surface, in the arithmetic processing step, a shape dimension of the first flank surface is calculated on the basis of the first captured image captured in a first state in which a focusing position is adjusted to match a position of the first flank surface on the cross section, and a shape dimension of the second flank surface is calculated on the basis of the second captured image captured in a second state in which a focusing position is brought closer to the pipe axis by a predetermined distance than that in the first state so that the focusing position matches a position of the second flank surface on the cross section. Further, the above-described "light that has passed between thread ridges" also includes light that has passed therebetween after being reflected (reflected once, reflected twice) on the first flank surface and the second flank surface.

(4) The aspect (3) described above may also be configured as follows:

The predetermined distance is obtained on the basis of an amount of deviation between a true position of the second flank surface in a pipe axis direction and a position of the second flank surface in the pipe axis direction calculated on the basis of the second captured image captured in the first state.

[Additional Statement]

(a) One aspect of the present invention is a thread shape dimension measuring device which measures a thread shape dimension of a threaded portion in a threaded pipe having the threaded portion formed at an end portion and on which a pair of flank surfaces defining each thread ridge of the threaded portion are both formed in an overhanging manner when viewed in a direction orthogonal to a cross section including a pipe axis, and the thread shape dimension measuring device includes an illumination unit illuminating the end portion of the threaded pipe by emitting parallel light in a first illumination direction inclined in a direction forming an angle larger than a lead angle of the threaded portion with respect to a direction orthogonal to the cross section including the pipe axis or a second illumination direction inclined to a side opposite to the lead angle of the threaded portion with respect to a direction orthogonal to the cross section including the pipe axis, an imaging unit disposed to face the illumination unit with the end portion of the threaded pipe interposed therebetween and configured to generate a first captured image of the end portion by imaging light that has passed between the thread ridges from the parallel light emitted in the first illumination direction and generate a second captured image of the end portion by imaging light that has passed between the thread ridges from the parallel light emitted in the second illumination direction, an adjustment unit adjusting a focusing position of the imaging unit, and an arithmetic processing unit calculating the thread shape dimension on the basis of the first captured image and the second captured image, in which, of the pair of flank surfaces, when a flank surface whose portion on the cross section including the pipe axis can be directly imaged by the imaging unit is defined as a first flank surface, and a flank surface whose portion on the cross section including the pipe axis cannot be directly imaged by the imaging unit is defined as a second flank surface, the arithmetic processing unit calculates a shape dimension of the first flank surface on the basis of the first captured image generated in a first state in which the focusing position of the imaging unit is adjusted by the adjustment unit so that the focusing position of the imaging unit matches a position of the first flank surface on the cross section, and calculates a shape dimension of the second flank surface on the basis of the second captured image generated in a second state in which the focusing position of the imaging unit is brought closer to the pipe axis by a predetermined distance than that in the first state by the adjustment unit so that the focusing position of the imaging unit matches a position of the second flank surface on the cross section.

Further, the above-described "light that has passed between thread ridges" also includes light that has passed therebetween after being reflected (reflected once, reflected twice) on the first flank surface and the second flank surface.

According to the aspect (a) described above, of the pair of flank surfaces, when a shape dimension of the first flank surface whose portion on the cross section including the pipe axis can be directly imaged by the imaging unit is calculated, similarly to the conventional focus method, it is possible to calculate the shape dimension of the first flank surface using the first captured image generated in the first state in which the focusing position of the imaging unit matches a position of the first flank surface on the cross section. Also, of the pair of flank surfaces, when a shape dimension of the second flank surface whose portion on the cross section including the pipe axis cannot be directly imaged by the imaging unit is calculated, as the present inventor has found, it is possible to calculate the shape dimension of the second flank surface without a position of the second flank surface being calculated to be deviated in the pipe axis direction by using the second captured image generated in the second state in which the focusing position of the imaging unit is brought closer to the pipe axis by a predetermined distance than that in the first state by the adjustment unit so that the focusing position matches a position of the second flank surface on the cross section. Therefore, according to the aspect (a) described above, it is possible to accurately calculate shape dimensions of both the pair of flank surfaces.

Further, the focusing position (focal position) of the imaging unit in the first state matches a position of the first flank surface on the cross section of the threaded pipe including the pipe axis (cross section in which the thread shape dimension is to be measured), but a distance between the imaging unit and the pipe axis of the threaded pipe in the first state (a distance in a direction orthogonal to the cross section including the pipe axis) can be determined by a focal distance of the imaging unit.

Also, as the illumination unit, it is possible to employ a configuration in which the first illumination direction and the second illumination direction are switched by, for example, changing an inclination of a member constituting the illumination unit, switching a driven member, or the like. However, the present invention is not limited thereto, an illumination unit emitting parallel light in the first illumination direction and an illumination unit emitting parallel light in the second illumination direction can be provided as completely separate units, and a combination of these illumination units can be used as the illumination unit in the aspect (a) described above.

Further, examples of the adjustment unit include (i) a configuration capable of supporting the imaging unit and moving the imaging unit in a direction orthogonal to the cross section of the threaded pipe including the pipe axis, (ii) a configuration capable of supporting the threaded pipe and moving the threaded pipe in a direction orthogonal to the cross section of the threaded pipe including the pipe axis, and (iii) a configuration capable of changing a focal distance of the imaging unit such as a zoom lens. With any of the configurations (i) to (iii) described above, a focusing position of the imaging unit can be adjusted.

(b) In the above-described aspect (a), the predetermined distance may be determined on the basis of an amount of deviation between a true position of the second flank surface in the pipe axis direction and a position of the second flank surface in the pipe axis direction calculated on the basis of the second captured image generated by the imaging unit in the first state.

In a case of above-described (b), as the true position of the second flank surface in the pipe axis direction, for example, a position of the second flank surface measured with a contact-type shape dimension measuring device is used.

Then, the predetermined distance for bringing the focusing position of the imaging unit closer to the pipe axis is determined so that the imaging unit is in the second state on the basis of the amount of deviation between the true position and the position of the second flank surface in the pipe axis direction calculated on the basis of the second captured image generated by the imaging unit in the first state (that is, the imaging unit before moving to the second state). Specifically, the predetermined distance can be calculated geometrically by the amount of deviation and the lead angle of the threaded portion.

(c) Another aspect of the present invention is a thread shape dimension measuring method for measuring a thread shape dimension of a threaded portion in a threaded pipe having the threaded portion formed at an end portion and on which a pair of flank surfaces defining each thread ridge of the threaded portion are both formed in an overhanging manner when viewed in a direction orthogonal to a cross section including a pipe axis, and the thread shape dimension measuring method includes a first illumination step of illuminating the end portion of the threaded pipe by emitting parallel light in a first illumination direction inclined in a direction forming an angle larger than a lead angle of the threaded portion with respect to a direction orthogonal to the cross section including the pipe axis, a second illumination step of illuminating the end portion of the threaded pipe by emitting parallel light in a second illumination direction inclined to a side opposite to the lead angle of the threaded portion with respect to a direction orthogonal to the cross section including the pipe axis, an imaging step of using an imaging unit disposed to face the illumination unit with the end portion of the threaded pipe interposed therebetween to generate a first captured image of the end portion by imaging light that has passed between the thread ridges from the parallel light emitted in the first illumination direction and generate a second captured image of the end portion by imaging light that has passed between the thread ridges from the parallel light emitted in the second illumination direction, and an arithmetic processing step of calculating the thread shape dimension of the threaded portion on the basis of the first captured image and the second captured image, in which, of the pair of flank surfaces, when a flank surface whose portion on the cross section including the pipe axis can be directly imaged by the imaging unit is defined as a first flank surface, and a flank surface whose portion on the cross section including the pipe axis cannot be directly imaged by the imaging unit is defined as a second flank surface, in the arithmetic processing step, a shape dimension of the first flank surface is calculated on the basis of the first captured image generated in a first state in which a focusing position of the imaging unit is adjusted by an adjustment unit so that the focusing position of the imaging unit matches a position of the first flank surface on the cross section, and a shape dimension of the second flank surface is calculated on the basis of the second captured image generated in a second state in which the focusing position of the imaging unit is brought closer to the pipe axis by a predetermined distance than that in the first state by the adjustment unit so that the focusing position of the imaging unit matches a position of the second flank surface on the cross section.

Further, the above-described "light that has passed between thread ridges" also includes light that has passed therebetween after being reflected (reflected once, reflected twice) on the first flank surface and the second flank surface.

(d) In the aspect (c) described above, the predetermined distance may be determined on the basis of an amount of deviation between a true position of the second flank surface in a pipe axis direction and a position of the second flank surface in the pipe axis direction calculated on the basis of the second captured image generated by the imaging unit in the first state.

Effects of the Invention

According to each of the above-described aspects of the present invention, it is possible to accurately measure a shape dimension of the flank surface of the threaded pipe on which a pair of flank surfaces defining each thread ridge of the threaded portion are formed in an overhanging manner.

BRIEF DESCRIPTION OF DRAWINGS

FIG. 7 is a view illustrating an example of a first captured image and a partially enlarged view thereof generated by an imaging unit of the thread shape dimension measuring device. The present figure is not a photograph of a sample cut from the threaded pipe, but a photograph taken from a lateral side of the threaded pipe itself.

FIG. 8 is a view illustrating an example of a second captured image and a partially enlarged view thereof generated by the imaging unit of the thread shape dimension measuring device. The present figure is also not a photograph of a sample cut from the threaded pipe, but a photograph taken from a lateral side of the threaded pipe itself.

FIG. 11 is a view illustrating each of parallel lights in FIGS. 9(a) and 9(b) from a direction parallel to the paper surface.

FIG. 16 is a diagram schematically illustrating an optical path through which the imaging unit in the first state and the second state receives light when the shape dimension of the second flank surface is calculated.

FIG. 17 is a diagram schematically illustrating an optical path through which the imaging unit in the first state and the second state receives light when the shape dimension of the second flank surface is calculated.

EMBODIMENT FOR IMPLEMENTING THE INVENTION

Hereinafter, a thread shape dimension measuring method and a thread shape dimension measuring device according to one embodiment of the present invention will be described with reference to the accompanying drawings as appropriate.

Hereinafter, first, a threaded pipe, which is an object to be measured, will be described again on the basis of FIGS. 1 and 2. Next, an outline of the thread shape dimension measuring method will be described on the basis of FIG. 3. Further, details of the thread shape dimension measuring device and the thread shape dimension measuring method will be described with reference to FIG. 4 and subsequent figures.

[Threaded Pipe]

Figure 1:
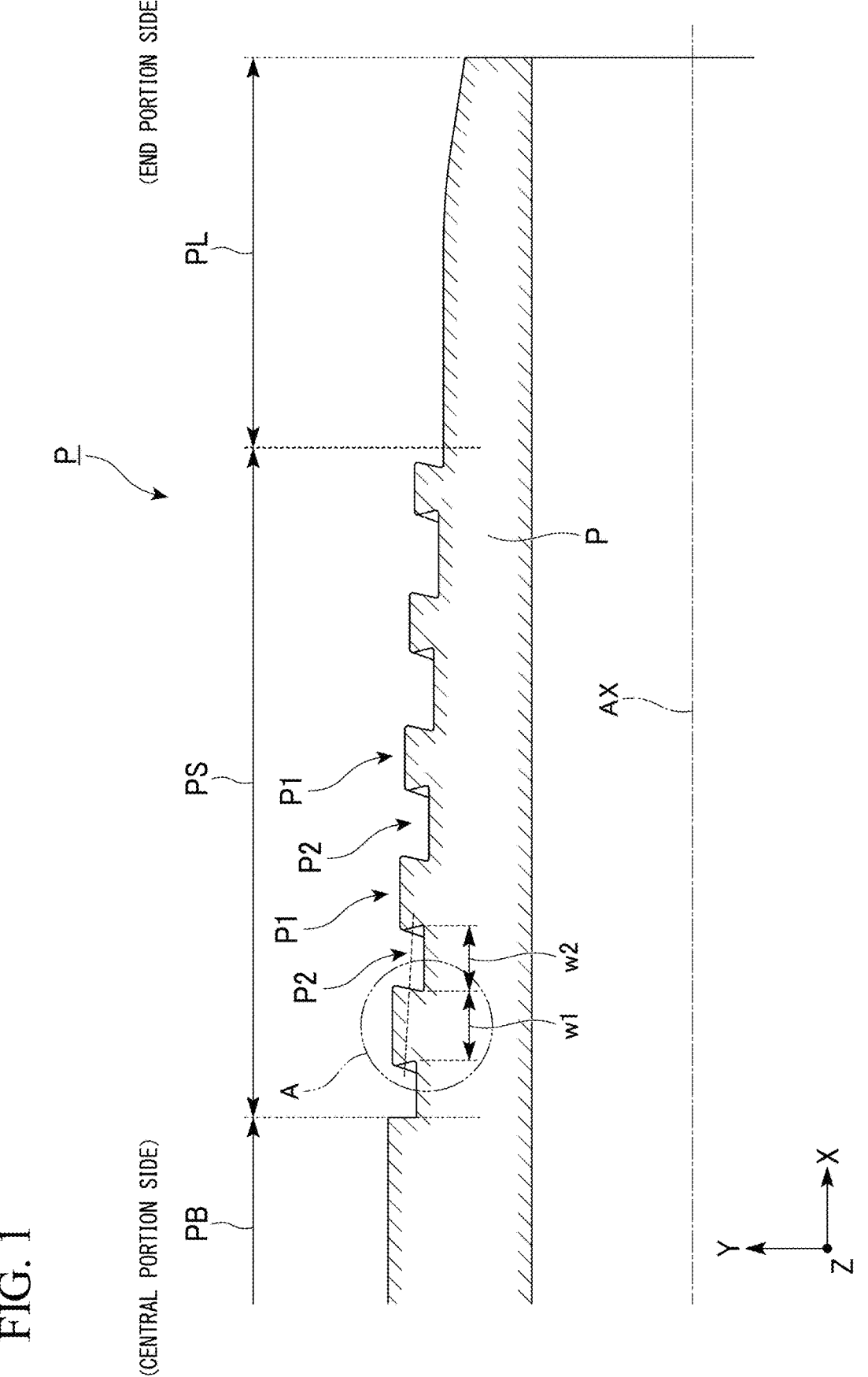
FIG. 1 is a view schematically illustrating an example of an end portion shape of a threaded pipe having a threaded portion on which a pair of flank surfaces are formed in an overhanging manner, and is a cross-sectional view seen in a cross section including a pipe axis thereof.

FIG. 1 is a view schematically illustrating an example of an end portion shape of a threaded pipe P having a threaded portion on which a pair of flank surfaces are formed in an overhanging manner, and is a cross-sectional view seen in a cross section including a pipe axis AX thereof. FIG. 1 mainly illustrates a half with the pipe axis AX as a boundary. Also, FIG. 2 is an enlarged cross-sectional view of a part A in FIG. 1.

As illustrated in FIG. 1, the threaded pipe P is a steel pipe having a main body PB, a threaded portion PS, and a lip portion PL. These main body PB, threaded portion PS, and lip portion PL have the common pipe axis AX. A bevel portion (not illustrated) may be provided between the threaded portion PS and the lip portion PL. In the following description, when the threaded pipe P is viewed in a longitudinal direction thereof, a side toward the main body PB may be referred to as a central portion side, and a side toward one end and the other end may be referred to as an end portion side. The threaded pipe P can be connected to another threaded pipe P by being screwed into a female threaded portion formed in a joint (not illustrated).

The main body PB is a hollow pipe with a constant inner diameter and outer diameter. The threaded portion PS is a hollow pipe formed coaxially and integrally with each of one end and the other end of the main body PB, and has an inner circumferential surface having the same inner diameter as the main body PB and an outer circumferential surface on which a male thread is formed. The lip portion PL is a hollow pipe formed coaxially and integrally with each end portion side of a pair of the threaded portions PS, and has an inner circumferential surface having the same inner diameter as the main body PB and an outer circumferential surface that is tapered toward the end portion side.

Figure 2:
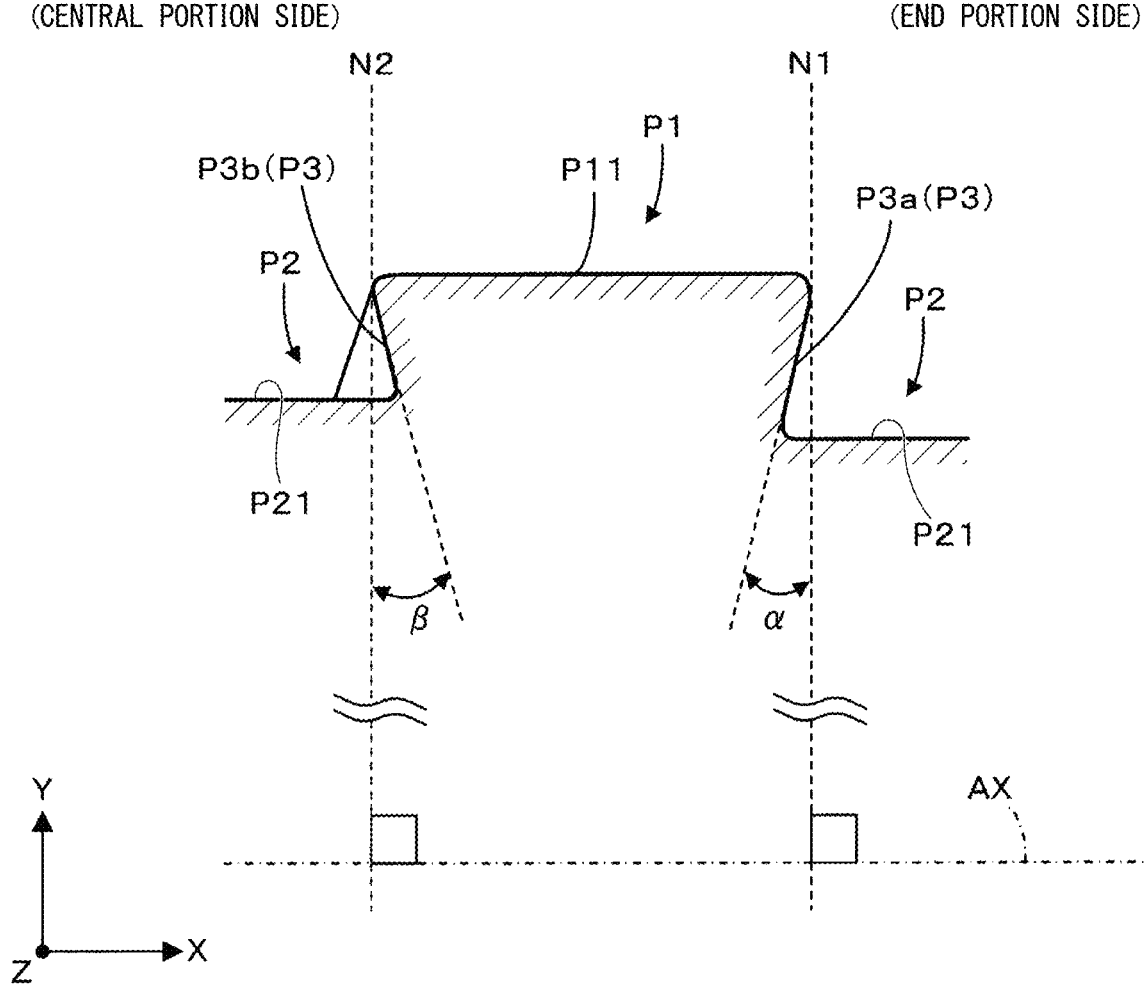
FIG. 2 is a view illustrating the threaded portion and is an enlarged cross-sectional view of a part A in FIG. 1.

As illustrated in FIG. 2, the male thread of the threaded portion PS has a pair of a flank surface (stub flank, first flank surface) P3a far from the main body PB and a flank surface (load flank, second flank surface) P3b close to the main body PB when one thread ridge is viewed in a cross section including the pipe axis AX. In the following description, the pair of the flank surface P3a and the flank surface P3b may be collectively referred to as a flank surface P3.

As illustrated in FIG. 2, the flank surface P3a forms a side surface in an overhanging manner in which it becomes further away from a cross section N1, which is perpendicular to the pipe axis AX, from a radially outer side toward a radially inner side with respect to the cross section N1. The flank surface P3a forming a negative angle α with respect to the cross section N1 in this way may be referred to as an inverse surface. The flank surface P3a has a spiral shape with the pipe axis AX as a center, but has a linear shape when viewed in a cross section including the pipe axis AX. An upper end position on the flank surface P3a is continuous with a top surface P11 of a thread ridge P1 via an arc-shaped convex corner portion. Also, a lower end position on the flank surface P3a is continuous with a bottom surface P21 of a thread groove P2 via an arc-shaped concave corner portion.

As illustrated in FIG. 2, the flank surface P3b forms a side surface in an overhanging manner in which it becomes further away from a cross section N2, which is perpendicular to the pipe axis AX, from a radially outer side toward a radially inner side with respect to the cross section N2. The flank surface P3b forming a negative angle β with respect to the cross section N2 in this way may be referred to as an inverse surface. The flank surface P3b has a spiral shape with the pipe axis AX as a center, but has a linear shape when viewed in a cross section including the pipe axis AX. An upper end position on the flank surface P3b is continuous with the top surface P11 of the thread ridge P1 via an arc-shaped convex corner portion. Also, a lower end position on the flank surface P3b is continuous with the bottom surface P21 of the thread groove P2 via an arc-shaped concave corner portion.

As described above, the pair of flank surfaces P3a and 3b are both spiral surfaces forming an inverse surface in an overhanging manner. Therefore, as illustrated in FIG. 2, when the threaded portion PS is viewed from a lateral side, one of the pair of flank surfaces P3a and P3b is directly visible, but the other is hidden behind and cannot be seen.

[Thread Shape Dimension Measuring Method]

Figure 3:
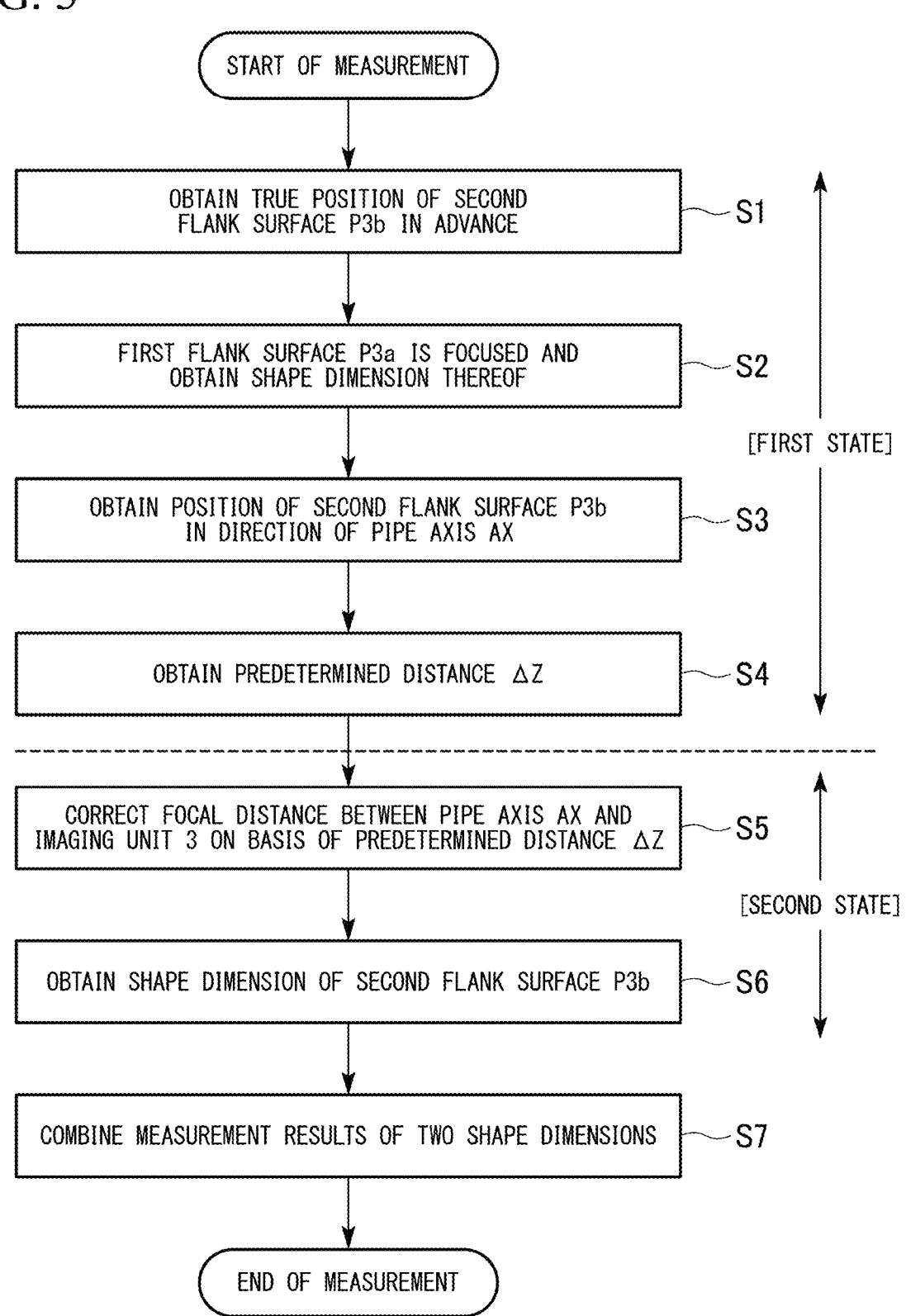
FIG. 3 is a flowchart showing an outline of each step of a thread shape dimension measuring method according to one embodiment of the present invention.

With the above-described threaded pipe P as an object to be measured, thread shape dimensions of the pair of flank surfaces P3a and P3b are measured. FIG. 3 is a flowchart showing an outline of each step of a thread shape dimension measuring method according to the present embodiment. Details of each step and a thread shape dimension measuring device used therefor will be described later, but an outline will be described using the present figure beforehand.

Steps S1 to S4 in FIG. 3 are performed with a device configuration set in a "first state" to be described later. On the other hand, steps S5 and S6 are performed with the device configuration set in a "second state" to be described later. Further, when a plurality of threaded pipes P are continuously measured, all the steps in FIG. 3 are performed only for the first threaded pipe P. Then, for the second and subsequent threaded pipes P, steps S1, S3, and S4 are omitted, and a predetermined distance ΔZ obtained for the first threaded pipe P is used for measurement. Therefore, for the second and subsequent threaded pipes P, steps S2, S5, S6, and S7 are executed in that order.

First, in step S1, a true position (focusing position) of the flank surface P3b in a direction of the pipe axis AX is obtained in advance. This true position can be obtained by using, for example, a contact-type shape dimension measuring device (not illustrated) such as a contracer.

In the following step S2, in the first state, the flank surface P3a is focused at a position on a cross section M (FIG. 4) including the pipe axis AX. Then, in the focused state, a shape dimension of the flank surface P3a is measured.

In the following step S3, a position (focusing position) of the flank surface P3b on the cross section M (FIG. 4) including the pipe axis AX is obtained while maintaining the first state. The position obtained here is deviated from the "true position" described above.

In the following step S4, a difference value between the true position of the flank surface P3b obtained in step S1 and the position obtained in step S3 is obtained, and thereby an amount of positional deviation in a direction of the pipe axis AX is obtained. Then, the predetermined distance ΔZ to be described later is obtained as a correction amount of a focal distance required for correcting the amount of deviation.

In the following step S5, the second state in which a focal distance between the pipe axis AX and an imaging unit 3 is corrected on the basis of the predetermined distance ΔZ obtained in step S4 is set. Thereby, the flank surface P3b is focused at a position on the cross section M (FIG. 4) including the pipe axis AX.

In the following step S6, a shape dimension of the flank surface P3b is obtained while maintaining the focused state obtained in step S5.

Then, in a final step S7, the shape dimension of the flank surface P3a obtained in step S2 and the shape dimension of the flank surface P3b obtained in step S6 are combined, and thereby the shape dimension measurement of the threaded portion PS in a measurement range can be obtained. Further, since an imaging range of the imaging unit is small, when a shape dimension measurement is performed for the entire length of the threaded portion PS, steps S2, S5, and S6 are performed in that order for other imaging ranges after step S6. Then, finally, when step S7 is performed, the shape dimension measurement over the entire length of the threaded portion PS is completed.

The gist of the thread shape dimension measuring method including each of the above-described steps is as follows.

That is, the thread shape dimension measuring method of the present embodiment is configured to measure a thread shape dimension of the threaded portion PS in the threaded pipe P having the threaded portion PS formed at the end portion and on which the pair of flank surfaces P3a and P3b defining each thread ridge of the threaded portion PS are both formed in an overhanging manner when viewed in a cross section including the pipe axis AX.

Then, the thread shape dimension measuring method includes a first illumination step and a second illumination step. In the first illumination step, the end portion is illuminated by emitting parallel light in a first illumination direction inclined in a direction forming an angle larger than a lead angle of the threaded portion PS with respect to a direction orthogonal to the cross section including the pipe axis AX. The first illumination step is included in step S2 of FIG. 3.

Also, in the second illumination step, the end portion is illuminated by emitting parallel light in a second illumination direction inclined to a side opposite to the lead angle of the threaded portion PS with respect to a direction orthogonal to the cross section including the pipe axis AX. The second illumination step is included in steps S3 to S6 in FIG. 3.

Further, the thread shape dimension measuring method includes an imaging step. In the imaging step, in an imaging side facing an emitting source of the parallel light with the end portion interposed therebetween, a first captured image of the end portion is captured by receiving light that has passed between the thread ridges from the parallel light emitted in the first illumination direction. Also, a second captured image of the end portion is captured by receiving light that has passed between the thread ridges from the parallel light emitted in the second illumination direction. This imaging step is included in S2 to S6 in FIG. 3.

Further, the thread shape dimension measuring method includes an arithmetic processing step of calculating the thread shape dimension of the threaded portion PS on the basis of the first captured image and the second captured image. The arithmetic processing step is included in S2, S6, and S7 in FIG. 3.

Then, when one of the flank surfaces P3a and P3b whose portion on the cross section including the pipe axis AX can be directly imaged from the imaging side is defined as a first flank surface (the flank surface P3a), and one thereof whose portion on the cross section including the pipe axis AX cannot be directly imaged from the imaging side is defined as a second flank surface (the flank surface P3b), the arithmetic processing step calculates shape dimensions of the flank surface P3a and the flank surface P3b as follows.

That is, in the arithmetic processing step, a shape dimension of the flank surface P3a is calculated on the basis of the first captured image captured in the first state in which the focusing position is adjusted to match a position of the flank surface P3a on the cross section including the pipe axis AX.

Also, a shape dimension of the flank surface P3b is calculated on the basis of the second captured image captured in the second state in which the focusing position is brought closer to the pipe axis AX by a predetermined distance than that in the first state so that the focusing position matches a position of the flank surface P3b on the cross section including the pipe axis AX.

The predetermined distance refers to $\Delta Z$ in expression (1) to be described later, and is obtained on the basis of an amount of deviation between the true position of the flank surface P3b in the direction of the pipe axis AX and the position of the flank surface P3b in the direction of the pipe axis AX calculated on the basis of the second captured image captured in the first state.

[Thread Shape Dimension Measuring Device]

Figure 4:
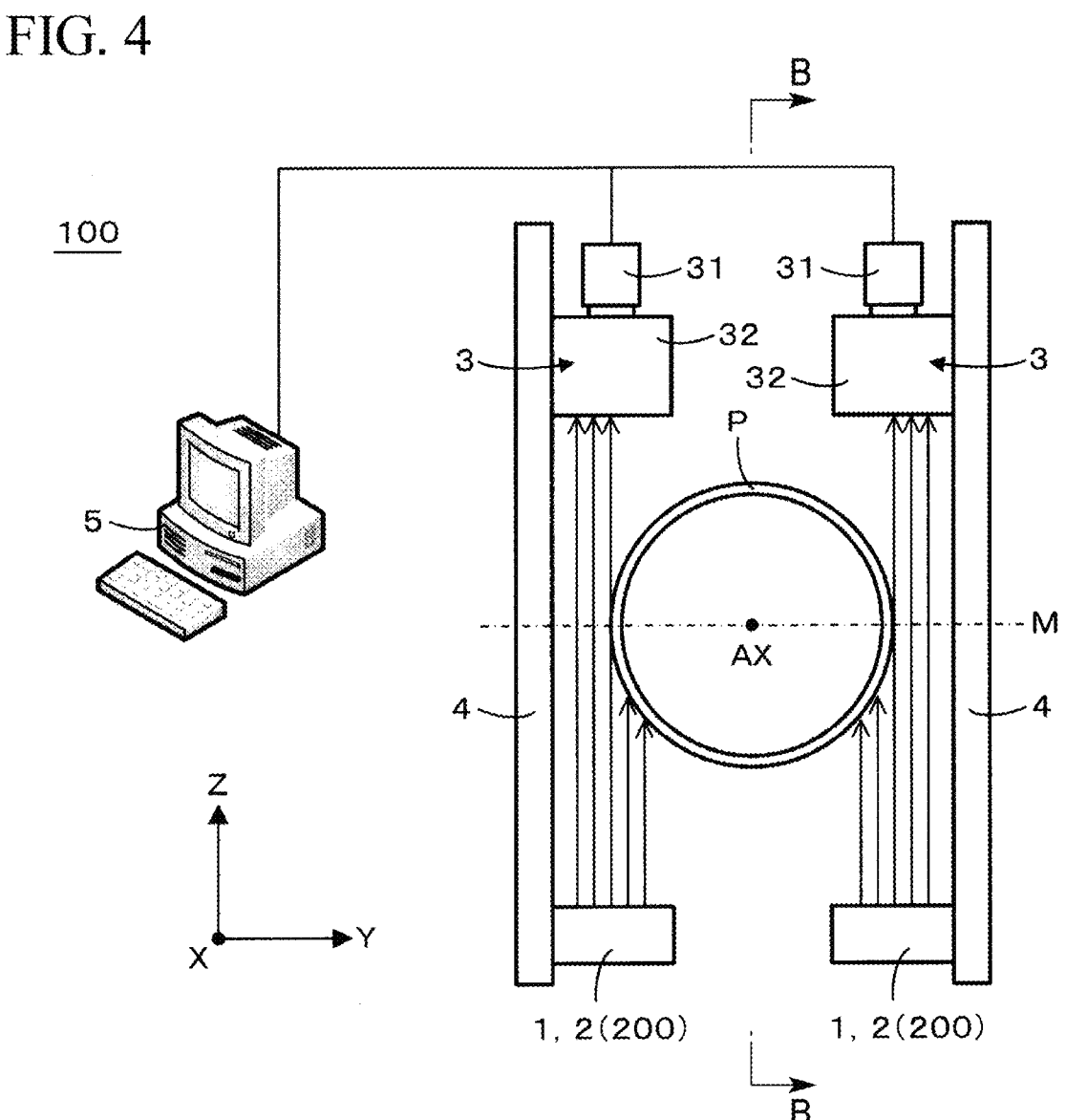
FIG. 4 is a view schematically illustrating a schematic configuration of a thread shape dimension measuring device according to the embodiment, a part of which is a side view from a direction of the pipe axis (X direction).
Figure 5:
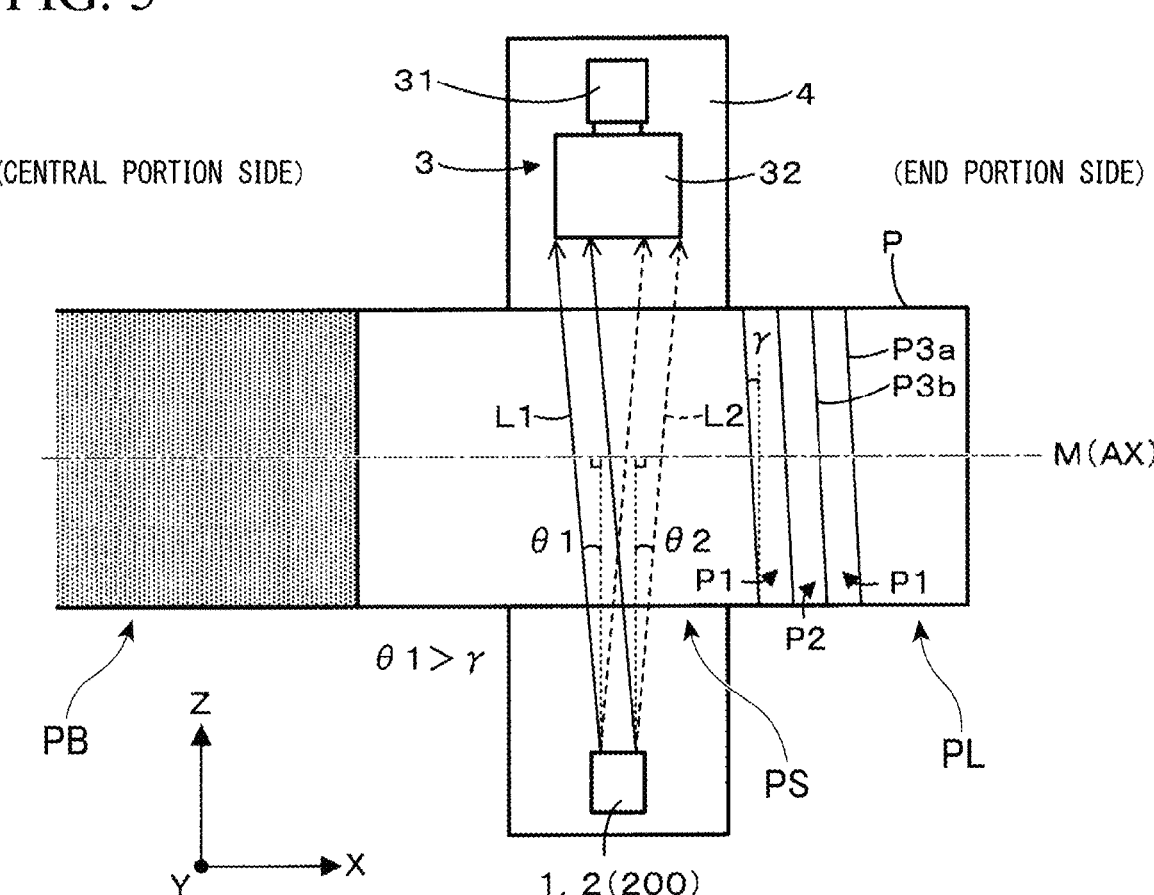
FIG. 5 is a view illustrating the thread shape dimension measuring device and is a side view of the threaded portion seen through the line B-B in FIG. 4.

FIG. 4 is a view schematically illustrating a schematic configuration of a thread shape dimension measuring device according to one embodiment of the present invention, a part of which is a side view from a direction (X direction) of the pipe axis AX. FIG. 5 is a view illustrating the same thread shape dimension measuring device and is a side view of the threaded portion PS seen through the line B-B in FIG. 4. That is, FIG. 5 is a side view of an optical system (an illumination unit 200 and the imaging unit 3) positioned on a right side as viewed in FIG. 4 when viewed from a direction (Y direction) parallel to the cross section (horizontal surface in the present embodiment) M including the pipe axis AX. Although a side view of the optical system positioned on the left side as viewed in FIG. 4 is omitted, it is the same view except that a lead angle γ of the threaded portion PS of the threaded pipe P is reversed from that illustrated in FIG. 5.

As illustrated in FIGS. 4 and 5, a thread shape dimension measuring device 100 according to the present embodiment is a device that measures a thread shape dimension of the threaded portion PS formed at the end portion of the threaded pipe P illustrated in FIG. 1 described above, and includes the illumination unit 200 (a first illumination unit 1 and a second illumination unit 2), the imaging unit 3, an adjustment unit 4, and an arithmetic processing unit 5.

The adjustment unit 4 has a function of adjusting a focusing position (Fa or Fb to be described later) of the imaging unit 3. In the present embodiment, as the adjustment unit 4, a configuration that supports the imaging unit 3 and can move the imaging unit 3 in a direction (Z direction, a vertical direction in the present embodiment) orthogonal to the cross section M of the threaded pipe P including the pipe axis AX is used. Specifically, the adjustment unit 4 is provided on both sides in the Y direction with the threaded pipe P interposed therebetween, each supporting the imaging unit 3, and is constituted by a uniaxial stage capable of moving the imaging unit 3 in a direction orthogonal to the cross section M including the pipe axis AX.

In the present embodiment, not only the imaging unit 3 but also the illumination unit 200 is attached to the adjustment unit 4 on both sides, and the illumination unit 200 and the imaging unit 3 are movable integrally in the Z direction. However, the present invention is not limited to this configuration, and it is also possible to employ a configuration in which only the imaging unit 3 is movable in the Z direction due to the adjustment unit 4. Also, as the adjustment unit 4, it is also possible to employ a configuration that supports the threaded pipe P and can move the threaded pipe P in a direction orthogonal to the cross section M of the threaded pipe P including the pipe axis AX. Further, a configuration in which a focal distance of the imaging unit 3 can be changed such as a zoom lens can be employed. Also, as the adjustment unit 4, one such as, for example, a gonio stage or a rotation stage, having a function of changing a position or an angle of the imaging unit 3 may be employed.

The illumination unit 200 of the present embodiment is configured to switch a function as the first illumination unit 1 that emits parallel light in the first illumination direction to be described later and a function as the second illumination unit 2 that emits parallel light in the second illumination direction to be described later by changing an inclination of a member constituting the illumination unit 200, switching a driven member, or the like. However, the present invention is not limited to this configuration, and it is also possible to make the first illumination unit 1 and the second illumination unit 2 completely separate illumination units.

Further, in the present embodiment, in order to illuminate and image portions of the threaded pipe P facing each other in the Y direction with the pipe axis AX interposed therebetween, two sets of the optical systems (the illumination unit 200 and the imaging unit 3) having the same configuration are provided.

Further, in FIG. 5, for the sake of convenience, although illustration of the threaded portion PS is simplified (only a part of the thread ridge P1 and the thread groove P2 is illustrated), a portion of the threaded pipe P not illustrated by hatching is the end portion of the threaded pipe P, and the threaded portion PS and the lip portion PL are formed on the outer circumferential surface of the end portion as described in FIG. 1. The threaded pipe P is fixed by a chuck (not illustrated) or the like when the thread shape dimension is measured by the thread shape dimension measuring device 100 according to the present embodiment.

Hereinafter, a more specific configuration of each component other than the adjustment unit 4 included in the thread shape dimension measuring device 100 will be described in order.

<Illumination Unit 200 (First Illumination Unit 1 and Second Illumination Unit 2)>

The first illumination unit 1 has an optical axis inclined in a direction forming the angle θ1 larger than the lead angle γ of the threaded portion PS with respect to a direction (Z direction) orthogonal to the cross section M of the threaded pipe P including the pipe axis AX (an optical axis inclined at the angle θ1 on the same side as the lead angle γ (counterclockwise in the example illustrated in FIG. 5) with respect to the Z direction). The first illumination unit 1 illuminates the end portion of the threaded pipe P by emitting parallel light L1 (the arrow indicated by the solid line in FIG. 5) having a predetermined spread in the X direction and the Y direction and inclined at the angle θ1 to the same side as the lead angle γ with respect to the Z direction within an XZ plane formed by the X direction and the Z direction. In the present specification, this illumination direction is referred to as the first illumination direction. A cross section perpendicular to the optical axis of the beam of light of the parallel light L1 emitted from the first illumination unit 1 has an area that is sufficiently larger than a range (that is, an imaging field of view) to be imaged by the imaging unit 3. Since the parallel light L1 is reflected by the flank surface P3 and a regular reflection component of the reflected light needs to be imaged by the imaging unit 3, the angle θ1 is preferably set to about 2γ.

In practice, since the lead angle γ has a variation (hereinafter, a maximum lead angle is referred to as γmax and a minimum lead angle is referred to as γmin) or the like depending on types of the threaded portion PS, it is preferable to adjust the optical axis so that the angle θ1 of the optical axis of the first illumination unit 1 satisfies θ1=2γ according to the lead angle γ of the threaded portion PS which is an object to be measured. Alternatively, since 2(γmax−γmin) is practically not so large, the parallel light L1 having the same spread as 2(γmax−γmin) may be emitted from the first illumination unit 1 with the angle of the optical axis set to satisfy θ1≈(γmax+γmin). Specifically, it is preferable to set such that θ1≤4° by providing a margin in consideration of an equipment constraint, bending of the threaded pipe P, or the like.

The second illumination unit 2 has an optical axis inclined at an angle θ2 to a side opposite to the lead angle γ of the threaded portion PS with respect to the direction (Z direction) orthogonal to the cross section M (an optical axis inclined at the angle θ2 to a side opposite to the lead angle γ (clockwise in the example illustrated in FIG. 5) with respect to the Z direction). The second illumination unit 2 illuminates the end portion of the threaded pipe P by emitting parallel light L2 (the arrow indicated by the broken line in FIG. 5) having a predetermined spread in the X direction and the Y direction and inclined at the angle θ2 to a side opposite to the lead angle γ with respect to the Z direction within the XZ plane formed by the X direction and the Z direction. In the present specification, this illumination direction is referred to as the second illumination direction. A cross section perpendicular to the optical axis of the beam of light of the parallel light L2 emitted from the second illumination unit 2 has an area that is sufficiently larger than a range imaged by the imaging unit 3 (that is, an imaging field of view).

Hereinafter, a specific configuration example of the first illumination unit 1 and second illumination unit 2 (the illumination unit 200) will be described.

Figure 6:
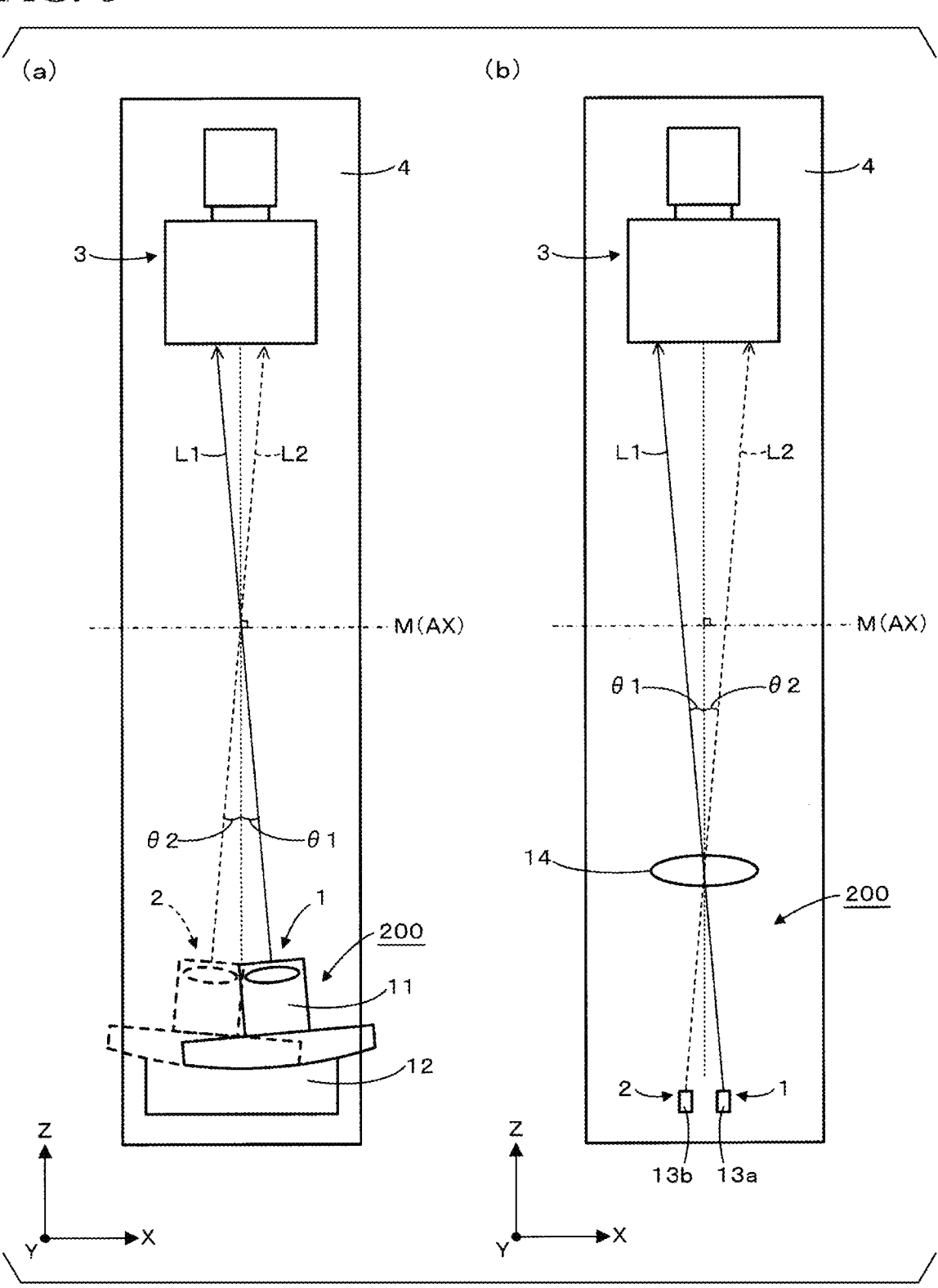
FIG. 6 is a view schematically illustrating a configuration example of an illumination unit provided in the thread shape dimension measuring device, and is a side view from the same line-of-sight direction as that in FIG. 5. Here, (a) illustrates a configuration example when an inclination of a light source is changed, and (b) illustrates a configuration example when ON/OFF between a pair of LEDs is switched.

FIG. 6 is a side view schematically illustrating a specific configuration example of the illumination unit 200. In FIG. 6, illustration of the threaded pipe P is omitted.

The illumination unit 200 illustrated in FIG. 6(*a*) includes a light source 11 and a gonio stage 12.

The light source 11 is not particularly limited as long as it emits parallel light, and for example, an LED illumination lamp with a lens, a halogen lamp with a lens, a laser, or the like can be used.

When the gonio stage 12 is driven, an optical axis of the light source 11 rotates around the axis in the Y direction. The light source 11 in a state illustrated by the solid line in FIG. 6(*a*) has an optical axis inclined at the angle θ1 to the same side as the lead angle γ (see FIG. 5) with respect to a direction (Z direction) orthogonal to the cross section M of the threaded pipe P including the pipe axis AX, and emits the parallel light L1 (only an optical axis of the parallel light L1 is illustrated in FIG. 6(*a*)) in a straight line as it is, that is, in the first illumination direction to illuminate the end portion of the threaded pipe P. That is, the illumination unit 200 in this state functions as the first illumination unit 1.

On the other hand, the light source 11 in a state illustrated by the broken line in FIG. 6(*a*) has an optical axis inclined at the angle θ2 to a side opposite to the lead angle γ with respect to a direction (Z direction) orthogonal to the cross section M, and emits the parallel light L2 (only an optical axis of the parallel light L2 is illustrated in FIG. 6(*a*)) in a straight line as it is, that is, in the second illumination direction to illuminate the end portion of the threaded pipe P. That is, the illumination unit 200 in this state functions as the second illumination unit 2.

As described above, the example illustrated in FIG. 6(*a*) has a configuration in which the function as the first illumination unit 1 and the function as the second illumination unit 2 are switched by changing an inclination of the light source 11 constituting the illumination unit 200.

The illumination unit 200 illustrated in FIG. 6(*b*) includes two light-emitting diodes (LEDs) 13*a* and 13*b*, and a lens 14.

The LED 13*a* and the LED 13*b* are disposed at positions away from an optical axis of the lens 14 in the X direction. The LED 13*a* and the LED 13*b* are disposed on opposite sides from each other with the optical axis of the lens 14 interposed therebetween. A distance between the LEDs 13*a* and 13*b* and the lens 14 in the Z direction is substantially equal to a focal distance of the lens 14.

Light emitted from the LED 13*a* becomes the parallel light L1 (only an optical axis of the parallel light L1 is illustrated in FIG. 6(*b*)) due to the lens 14, and illuminates the end portion of the threaded pipe P from a direction inclined at the angle θ1 to the same side as the lead angle γ (see FIG. 5), that is, the first illumination direction, with respect to a direction (Z direction) orthogonal to the cross section M of the threaded pipe P including the pipe axis AX. That is, a combination of the LED 13*a* and the lens 14 functions as the first illumination unit 1. Specifically, when the LED 13*a* is driven and driving of the LED 13*b* is stopped, the combination of the LED 13*a* and the lens 14 functions as the first illumination unit 1.

On the other hand, light emitted from the LED 13*b* becomes the parallel light L2 (only an optical axis of the parallel light L2 is illustrated in FIG. 6(b)) due to the lens 14, and illuminates the end portion of the threaded pipe P from a direction inclined at the angle θ2 to a side opposite to the lead angle γ, that is, the second illumination direction, with respect to a direction (Z direction) orthogonal to the cross section M. That is, a combination of the LED 13b and the lens 14 functions as the second illumination unit 2. Specifically, when the LED 13b is driven and driving of the LED 13a is stopped, the combination of the LED 13b and the lens 14 functions as the second illumination unit 2.

As described above, the example illustrated in FIG. 6(b) has a configuration in which the function as the first illumination unit 1 and the function as the second illumination unit 2 are switched between by switching the driving of the LED 13a and the LED 13b constituting the illumination unit 200.

The first illumination unit 1 and the second illumination unit 2 of the present embodiment are not limited to the configuration illustrated in FIG. 5. As the first illumination unit 1, various configurations can be employed as long as it has an optical axis inclined in a direction forming an angle larger than the lead angle γ of the threaded portion PS with respect to a direction (Z direction) orthogonal to the cross section M, and can emit the parallel light L1 to illuminate the end portion of the threaded pipe P. Also, as the second illumination unit 2, various configurations can be employed as long as it has an optical axis inclined to a side opposite to the lead angle γ of the threaded portion PS with respect to a direction (Z direction) orthogonal to the cross section M, and can emit the parallel light L2 to illuminate the end portion of the threaded pipe P.

<Imaging Unit 3>

The imaging unit 3 is disposed to face the first illumination unit 1 and the second illumination unit 2 with the end portion of the threaded pipe P interposed therebetween, and configured to generate the first captured image of the end portion of the threaded pipe P by imaging light that has passed through without being obstructed by the end portion of the threaded pipe P (light that has passed between the thread ridges) from the parallel light L1 emitted in the first illumination direction from the first illumination unit 1. Also, the second captured image of the end portion of the threaded pipe P is generated by imaging light that has passed through without being obstructed by the end portion of the threaded pipe P (light that has passed between the thread ridges) from the parallel light L2 emitted from the second illumination unit 2.

The imaging unit 3 is configured by a combination of an imaging element and a lens that forms an image on the imaging element. Specifically, as illustrated in FIGS. 5 and 6, the imaging unit 3 includes an imaging unit main body 31 and a telecentric lens 32 attached to the imaging unit main body 31. The imaging unit main body 31 includes the imaging element such as CCD or CMOS disposed two-dimensionally. The imaging unit 3 includes the telecentric lens 32, and thereby a parallel light component can be easily received by the imaging element of the imaging unit main body 31.

The imaging unit 3 has a visual axis in a direction (Z direction) orthogonal to the cross section M. Then, since the imaging unit 3 includes the telecentric lens 32, an angle of view near an object surface is 0°, and a magnification is constant, the imaging unit 3 is suitable for dimension measurement.

Here, of the pair of the flank surfaces P3, the flank surface P3 whose portion on the cross section M can be directly imaged by the imaging unit 3 (in the example illustrated in FIG. 5, the flank surface P3a positioned on the end portion side of the threaded pipe P, which is the flank surface P3 on a side facing the imaging unit 3) is defined as the first flank surface, and the flank surface whose portion on the cross section M cannot be directly imaged by the imaging unit 3 (in the example illustrated in FIG. 5, the flank surface P3b positioned on the central portion side of the threaded pipe P, which is the flank surface P3 on a side not facing the imaging unit 3) is defined as the second flank surface. In this case, when a shape dimension of the first flank surface is calculated, a position of the imaging unit 3 (a position in the Z direction) is adjusted by the adjustment unit 4 according to a disposition position of the threaded pipe P so that a focusing position of the imaging unit 3 is in a state (first state) of matching a position of the first flank surface on the cross section M, and thereby the first captured image is generated by the imaging unit 3 of the first state. On the other hand, when a shape dimension of the second flank surface is calculated, the position (position in the Z direction) of the imaging unit 3 is adjusted by the adjustment unit 4 according to a disposition position of the threaded pipe P so that the focusing position of the imaging unit 3 is in a state (second state) of matching a position of the second flank surface on the cross section M, and thereby the second captured image is generated by the imaging unit 3 of the second state.

A more specific description of the first state and the second state will be made later.

Figure 7:
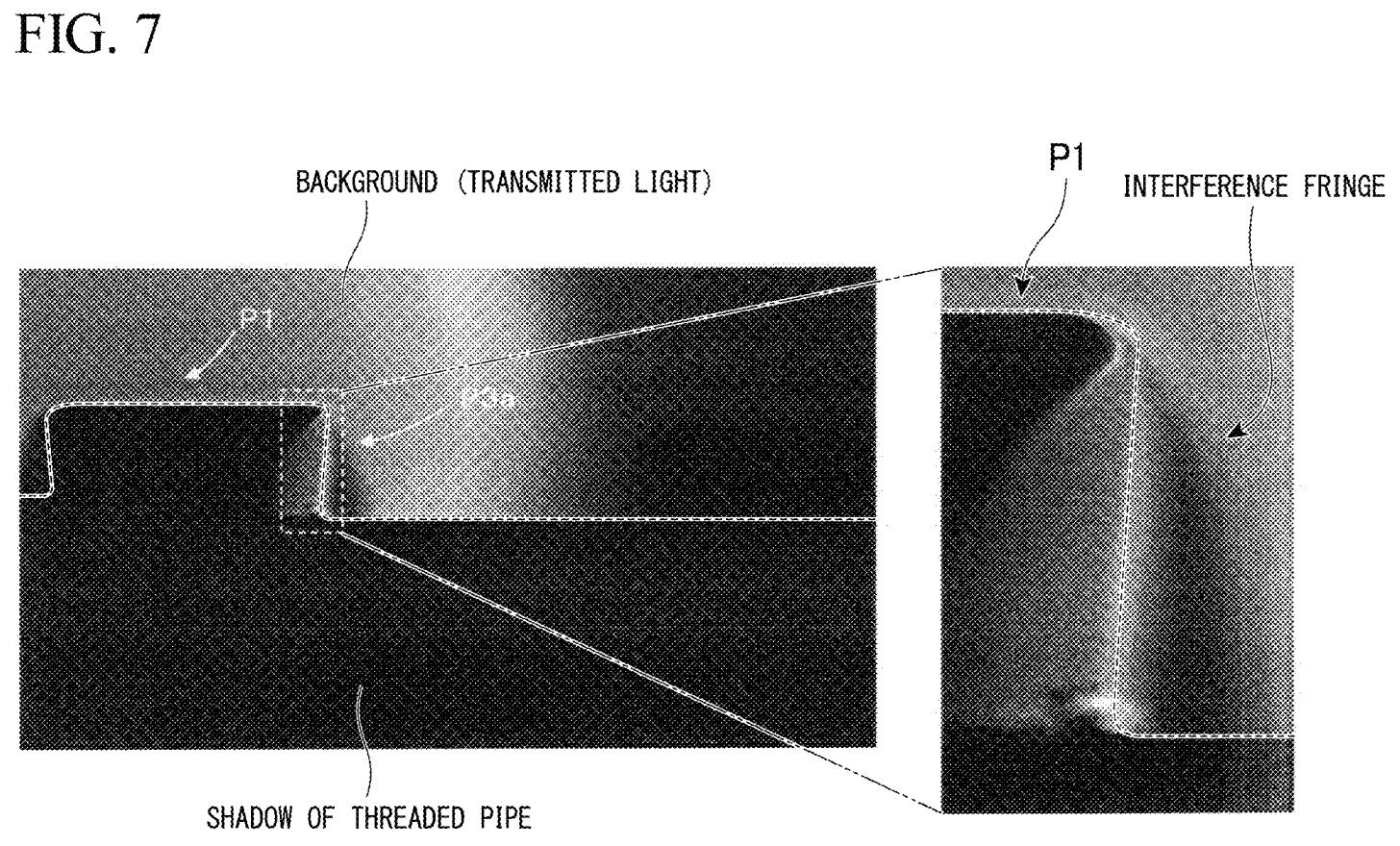
Figure 8:
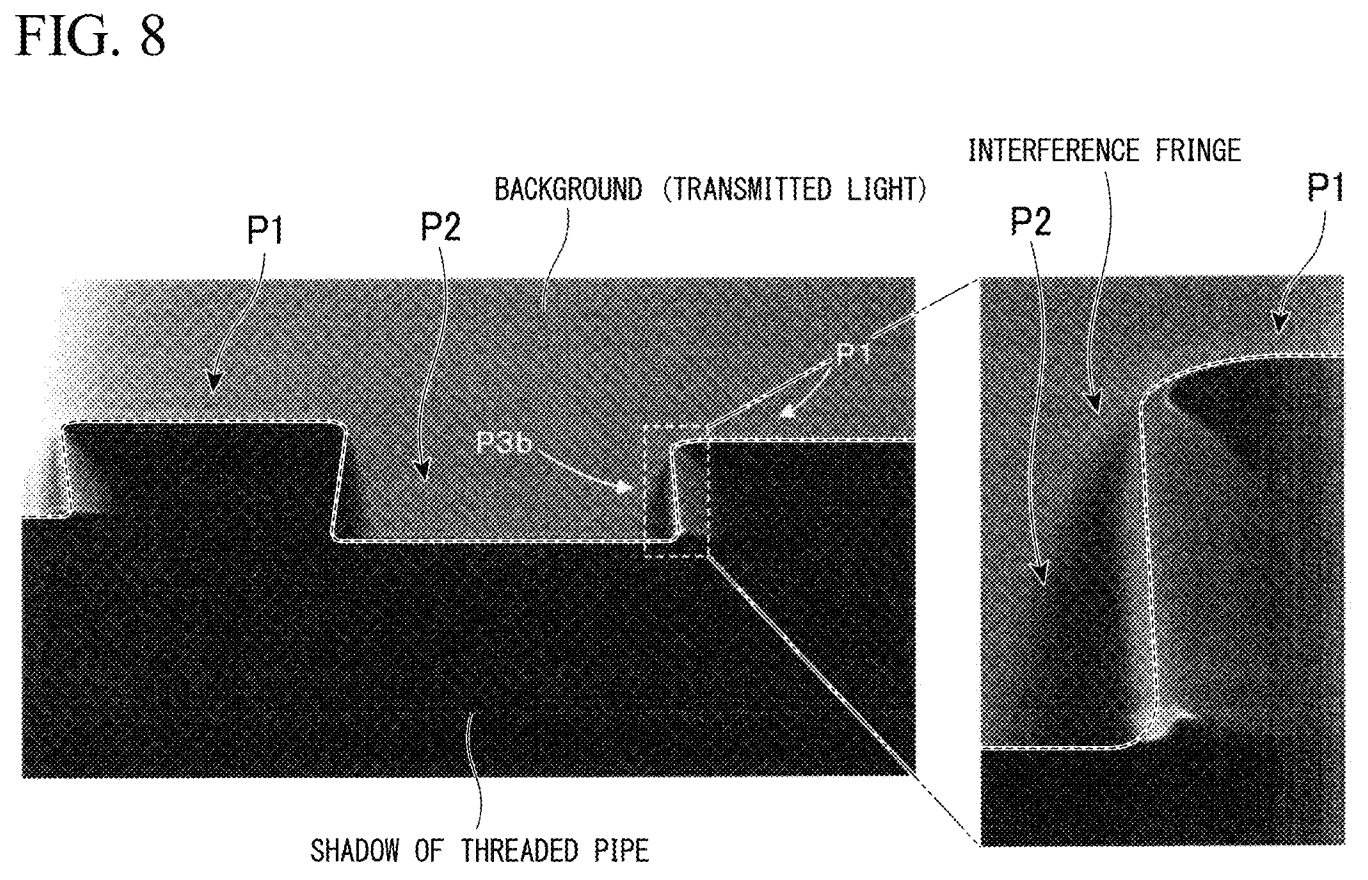

FIGS. 7 and 8 are views illustrating examples of the first captured image and the second captured image generated by the imaging unit 3. The left view in FIG. 7 is an example of the first captured image obtained when θ1=2°, and the right view in FIG. 7 is an enlarged view of the region surrounded by the broken line illustrated in the left view in FIG. 7. The left view in FIG. 8 is an example of the second captured image obtained when θ2=1°, and the right view in FIG. 8 is an enlarged view of the region surrounded by the broken line illustrated in the left view in FIG. 8.

As can be found from FIG. 7, the first captured image in which a grayscale pattern such as interference fringes is generated in a pixel region corresponding to the flank surface P3a is generated. Similarly, as can be found from FIG. 8, a second captured image in which a grayscale pattern like interference fringes is generated is also generated in a pixel region corresponding to the flank surface P3b is generated. Therefore, it is possible to calculate the shape dimension of the flank surface P3 (the flank surfaces P3a and P3b) by extracting the pixel region in which the grayscale pattern such as interference fringes is generated in the first captured image and the second captured image.

<Arithmetic Processing Unit 5>

The arithmetic processing unit 5 is connected to the imaging unit 3 and calculates a shape dimension of the threaded portion PS (a shape dimension of the first flank surface and the second flank surface) formed at the end portion of the threaded pipe P on the basis of the first captured image and the second captured image generated by the imaging unit 3.

Specifically, the arithmetic processing unit 5 calculates a focusing degree (which is an indicator representing a degree of focusing and is represented by a contrast and a deviation in concentration between adjacent pixels) of the pixels constituting the first captured image by performing image processing on the first captured image. As described above, since it is considered that a pixel region in which a grayscale pattern such as interference fringes is generated has a high focusing degree, the arithmetic processing unit 5 calculates pixels with a high focusing degree among the pixels constituting the first captured image as a shape of the first flank surface. Similarly, the arithmetic processing unit 5 calculates a focusing degree of the pixels constituting the second captured image by performing image processing on the second captured image, and calculates pixels with a high focusing degree among the pixels constituting the second captured image as a shape of the second flank surface.

Further, a specific method of calculating the focusing degree and a method of calculating the shape dimension of the flank surface P3 on the basis of the calculated focusing degree are the same as the methods described in Patent Document 2, and therefore detailed description thereof will be omitted here.

The arithmetic processing unit 5 is configured by, for example, a personal computer installed with a program for executing the arithmetic processing described above.

Hereinafter, the first state and second state described above will be described in more detail.

Figure 9:
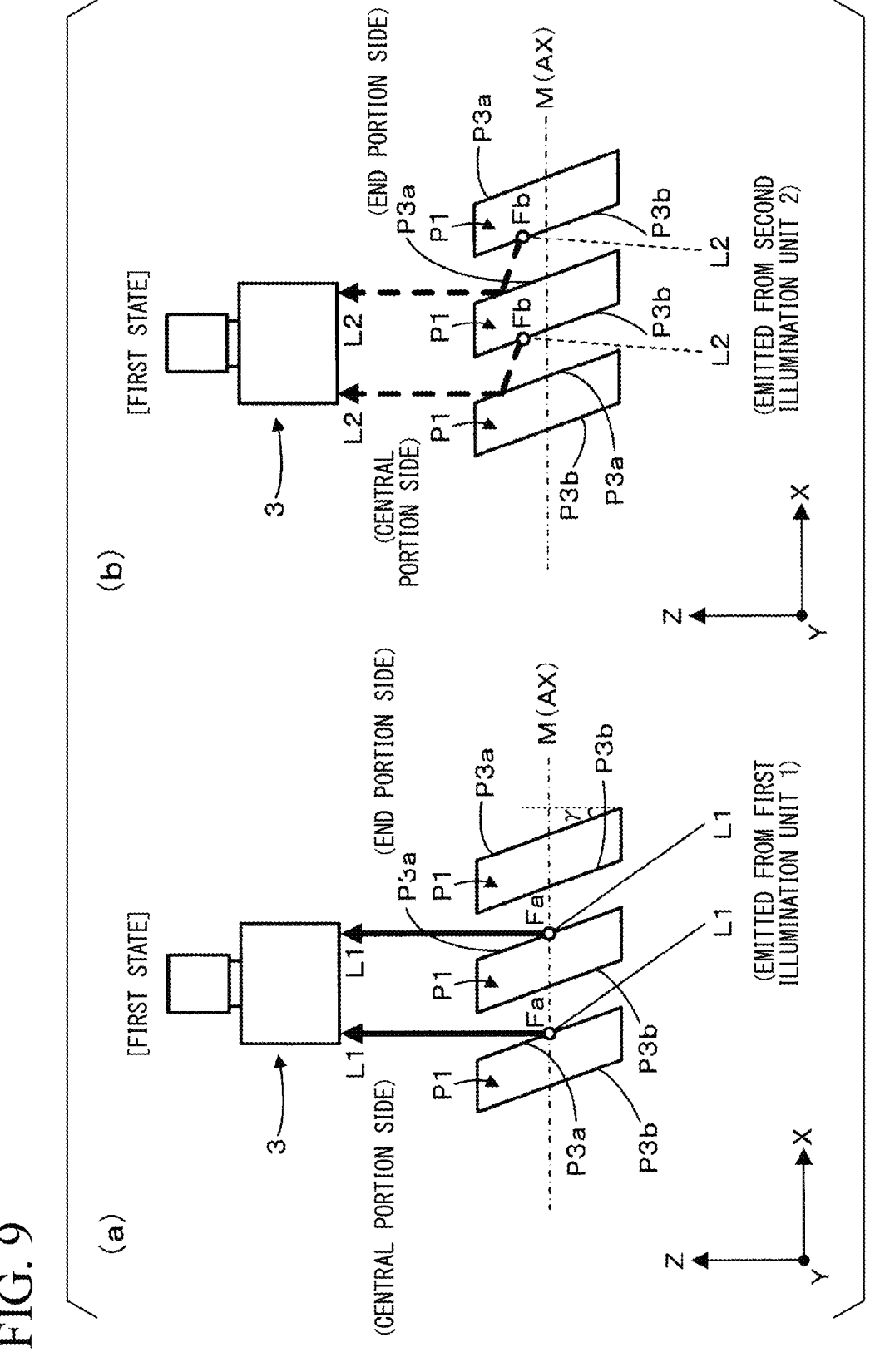
FIG. 9 is a diagram schematically illustrating an optical path when the imaging unit in a first state receives parallel light reflected by a first flank surface in the thread shape dimension measuring device. Here, (a) illustrates a case in which parallel light from a first illumination unit is received, and (b) illustrates a case in which parallel light from a second illumination unit is received.
Figure 10:
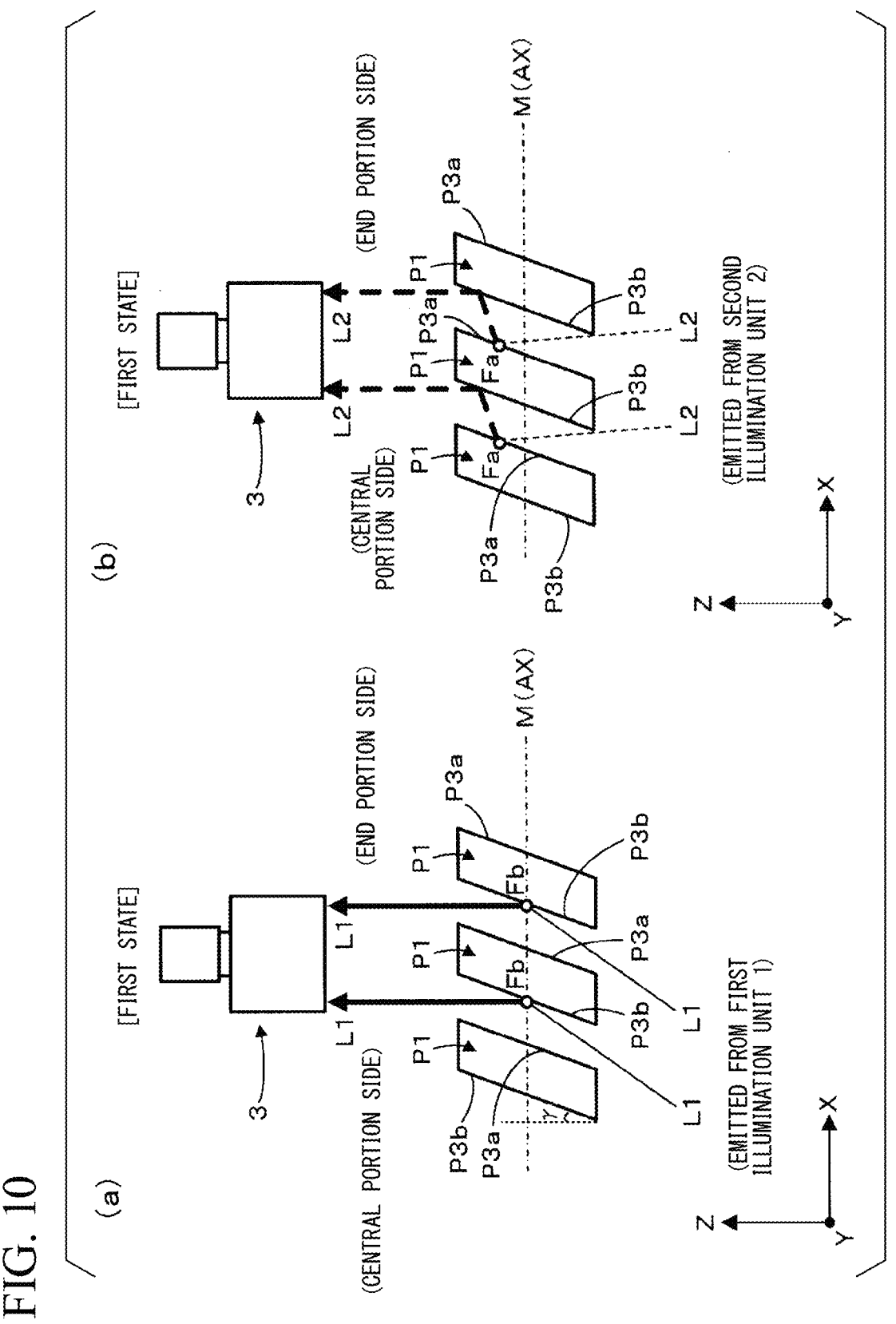
FIG. 10 is a diagram schematically illustrating an optical path when the imaging unit in a first state receives parallel light reflected by a second flank surface in the thread shape dimension measuring device. Here, (a) illustrates a case in which parallel light from the first illumination unit is received, and (b) illustrates a case in which parallel light from the second illumination unit is received.

FIGS. 9 and 10 are diagrams schematically illustrating an optical path through which the imaging unit 3 in the first state receives light. Also, FIG. 11 is a view illustrating each of parallel lights in FIGS. 9(*a*) and 9(*b*) from a direction parallel to the paper surface.

FIG. 9(*a*) illustrates an optical path of the parallel light L1 emitted from the first illumination unit 1 until it is detected by the imaging unit 3 when the imaging unit 3 positioned on the right side as viewed in FIG. 4 is in the first state. In the state illustrated in FIG. 9(*a*), of the pair of flank surfaces P3*a* and P3*b*, the imaging unit 3 can directly image a portion of the flank surface P3*a* on the cross section M positioned on the end portion side of the threaded pipe P. Then, in the first state, a focusing position Fa of the imaging unit 3 matches the position of the flank surface P3*a* on the cross section M. The imaging unit 3 generates the first captured image by detecting the parallel light L1 emitted from the first illumination unit 1 and reflected by the flank surface P3*a* and imaging it at the focusing position Fa. Therefore, the arithmetic processing unit 5 can accurately calculate a shape of the first flank surface P3*a* on the cross section M on the basis of the first captured image focused at the position of the flank surface P3*a* on the cross section M.

FIG. 9(*b*) illustrates an optical path of the parallel light L2 emitted from the second illumination unit 2 until it is detected by the imaging unit 3 when the imaging unit 3 positioned on the right side as viewed in FIG. 4 is in the first state (when the position of the imaging unit 3 is not changed from the state illustrated in FIG. 9(*a*)). In the state illustrated in FIG. 9(*b*), of the pair of flank surfaces P3*a* and P3*b*, the imaging unit 3 cannot directly image a portion of the flank surface P3*b* on the cross section M positioned on the central portion side of the threaded pipe P, and therefore the flank surface P3*b* is the second flank surface. It is considered that the imaging unit 3 in the state illustrated in FIG. 9(*b*) generates the second captured image by detecting and imaging the parallel light L2 emitted from the second illumination unit 2, reflected by the flank surface P3*b* defining a certain thread ridge P1, and further reflected by the flank surface P3*a* defining an adjacent thread ridge P1. At this time, when an optical path length of the parallel light L1 in the portion illustrated by the thick solid line in FIG. 9(*a*) is assumed to be equal to an optical path length of the parallel light L2 in the portion illustrated by the thick broken line in FIG. 9(*b*) (when the focused state is the same), in the state illustrated in FIG. 9(*b*), a focusing position Fb of the imaging unit 3 is considered to be at a position closer to the imaging unit 3 (a position above the cross section M illustrated in FIG. 9(*b*)) than to the position of the second flank surface (the flank surface 3*b*) on the cross section M. Therefore, it is considered that the position (a position in the direction of the pipe axis AX of the threaded pipe P) of the second flank surface (the flank surface P3*b*) calculated by the arithmetic processing unit 5 on the basis of the second captured image focused at the position closer to the imaging unit 3 than to the position of the flank surface P3*b* on the cross section M is deviated to the central portion side of the threaded pipe P with respect to the position of the second flank surface (the flank surface P3*b*) on the cross section M.

Figure 11:
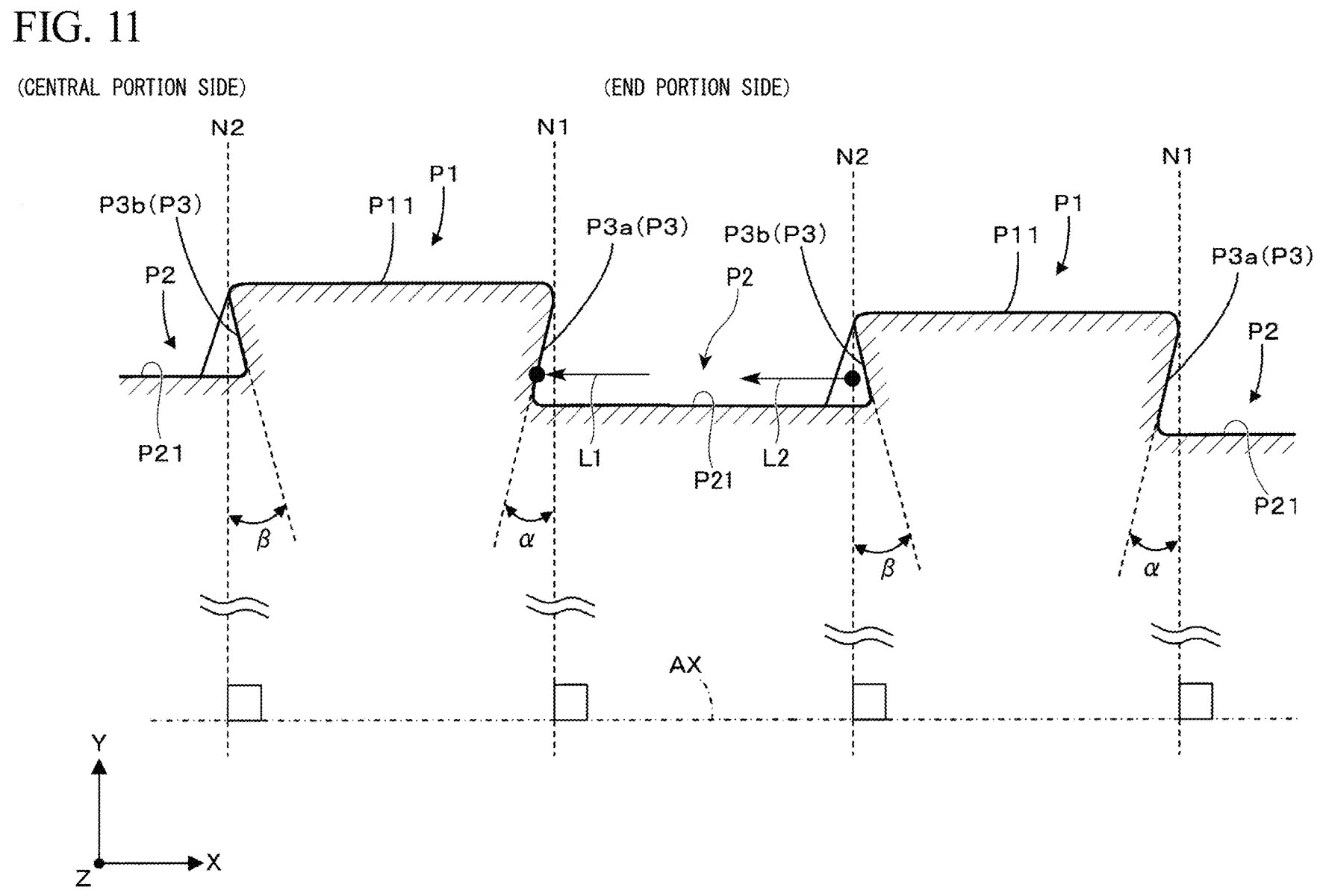

Further, for reference, FIG. 11 illustrates a view when the flank surfaces P3*a* and P3*b* of FIGS. 9(*a*) and 9(*b*) are viewed in a cross section including the pipe axis AX and perpendicular to the paper surface. As illustrated in FIG. 11, the parallel light L1 is at a position on the cross section including the pipe axis AX as also illustrated in FIG. 9(*a*). On the other hand, as also illustrated in FIG. 9(*b*), the parallel light L2 hits a position deviated to a back side of the same cross section, that is, a position close to the imaging unit 3.

FIG. 10(*a*) illustrates an optical path of the parallel light L1 emitted from the first illumination unit 1 until it is detected by the imaging unit 3 when the imaging unit 3 positioned on the left side in FIG. 4 is in the first state. FIG. 10(*a*) is different from the state illustrated in FIG. 9(*a*) in that the lead angle γ of the threaded portion of the threaded pipe P is reversed, and the parallel light L1 illuminates the flank surface P3*b* positioned on the central portion side of the threaded pipe P. In the state illustrated in FIG. 10(*a*), of the pair of flank surfaces P3*a* and P3*b*, the imaging unit 3 can directly image a portion of the flank surface P3*b* on the cross section M positioned on the central portion side of the threaded pipe P, and therefore the flank surface P3*b* is the first flank surface. Then, in the first state, the focusing position Fb of the imaging unit 3 matches a position of the first flank surface (the flank surface P3*b*) on the cross section M. The imaging unit 3 generates the first captured image by detecting the parallel light L1 emitted from the first illumination unit 1 and reflected by the flank surface P3*b* and imaging it at the focusing position Fb. Therefore, the arithmetic processing unit 5 can accurately calculate a shape dimension of the first flank surface (the first flank surface P3*b*) on the cross section M on the basis of the first captured image focused at the position of the flank surface P3*b* on the cross section M.

FIG. 10(*b*) illustrates an optical path of the parallel light L2 emitted from the second illumination unit 2 until it is detected by the imaging unit 3 when the imaging unit 3 positioned on the left side as viewed in FIG. 9(*a*) is in the first state (when the position of the imaging unit 3 is not changed from the state illustrated in FIG. 10(*a*)). In the state illustrated in FIG. 10(*b*), of the pair of flank surfaces P3*a* and P3*b*, the imaging unit 3 cannot directly image a portion of the flank surface P3*a* on the cross section M positioned on the end portion side of the threaded pipe P, and therefore the flank surface P3*a* is the second flank surface. It is considered that the imaging unit 3 in the state illustrated in FIG. 10(*b*) generates the second captured image by detecting and imaging the parallel light L2 emitted from the second illumination unit 2, reflected by the flank surface P3*a* defining a certain thread ridge P1, and further reflected by the flank surface P3*b* defining an adjacent thread ridge P1. At this time, when an optical path length of the parallel light L1 in the portion illustrated by the thick solid line in FIG. 10(*a*) is assumed to be equal to an optical path length of the parallel light L2 in the portion illustrated by the thick broken line in FIG. 10(*b*), in the state illustrated in FIG. 10(*b*), the focusing position Fa of the imaging unit 3 is considered to be at a position closer to the imaging unit 3 (a position above the cross section M illustrated in FIG. 10(*b*)) than to the position of the second flank surface (the flank surface P3*a*) on the cross section M. Therefore, it is considered that the position (a position in the direction of the pipe axis AX of the threaded pipe P) of the second flank surface (the flank surface P3*a*) calculated by the arithmetic processing unit 5 on the basis of the second captured image focused at the position closer to the imaging unit 3 than to the position of the flank surface P3*a* on the cross section M is deviated to the end portion side of the threaded pipe P with respect to the position of the second flank surface (the flank surface P3*a*) on the cross section M.

As described above, if both the pair of flank surfaces P3 are hook-shaped flank surfaces, when the shape dimensions of both the flank surfaces P3 are calculated in a state (the first state) in which a position (position in a visual axis direction) of the imaging unit 3 is fixed without changing, a position of one of the flank surfaces P3 is calculated to be deviated in the direction of the pipe axis AX.

Specifically, as illustrated in FIG. 9(*a*) and FIG. 10(*a*), when a shape dimension of the first flank surface (the flank surface P3*a* in FIG. 9(*a*) or the flank surface P3*b* in FIG. 10(*a*)) that faces the imaging unit 3 and can be directly imaged is measured, the shape dimension of the first flank surface can be accurately calculated on the basis of the first captured image generated by the imaging unit 3 in the first state.

On the other hand, as illustrated in FIG. 9(*b*) and FIG. 10(*b*), when a shape dimension of the second flank surface (the flank surface P3*b* in FIG. 9(*b*) or the flank surface P3*a* in FIG. 10(*b*)) that does not face the imaging unit 3 and hence cannot be directly imaged is measured, when the shape dimension of the second flank surface is calculated on the basis of the second captured image generated by the imaging unit 3 in the first state, the position of the second flank surface is calculated to be deviated in the direction of the pipe axis AX. Specifically, the position of the second flank surface (the flank surface P3*b*) illustrated in FIG. 9(*b*) is calculated to be deviated to the central portion side of the threaded pipe P, and the position of the second flank surface (the flank surface P3*a*) illustrated in FIG. 10(*b*) is calculated to be deviated to the end portion side of the threaded pipe P.

Figure 12:
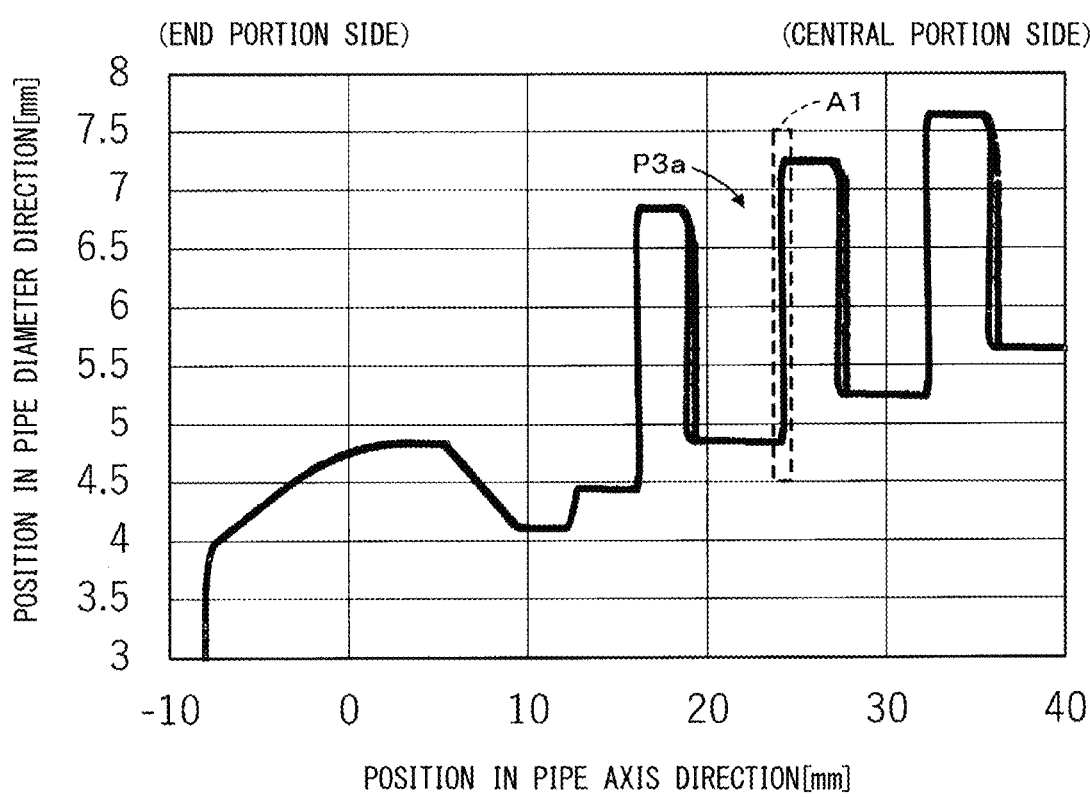
FIG. 12 shows an example of a result in which a result obtained by actually calculating a shape dimension of the first flank surface on the basis of the first captured image generated by the imaging unit in the first state illustrated in FIG. 9(a) is compared with a shape dimension of the first flank surface measured with a contact-type shape dimension measuring device. That is, it is a comparison of the measurement results of the shape dimensions of the threaded portion, and is illustrated in a graph in which the horizontal axis represents a position in a pipe axis direction and the vertical axis represents a position in a pipe diameter direction.
Figure 13:
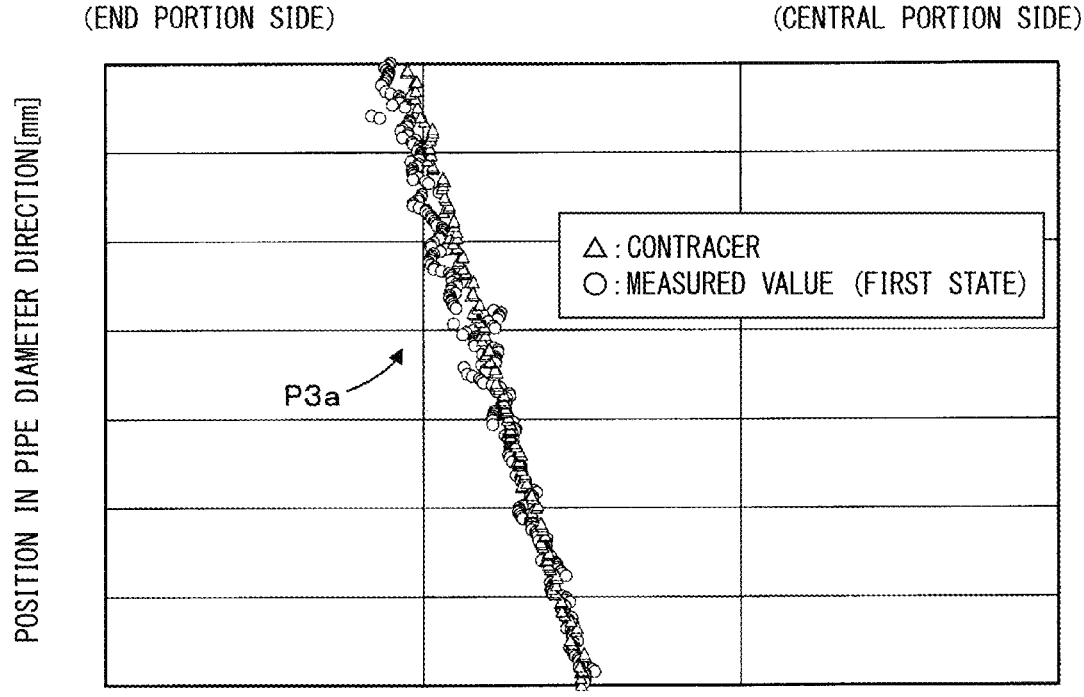
FIG. 13 is an enlarged view of a part A1 in FIG. 12 illustrating the shape dimension of the first flank surface. Here, the horizontal axis represents a position in the pipe axis direction, and the vertical axis represents a position in the pipe diameter direction.

FIGS. 12 and 13 show an example of a result in which a result obtained by actually calculating the shape dimension of the first flank surface P3*a* on the basis of the first captured image generated by the imaging unit 3 in the first state illustrated in FIG. 9(*a*) is compared with a shape of the first flank surface measured with a contact-type shape dimension measuring device (Mitutoyo contracer, stylus tip angle 20°, tip radius 25 μm). FIG. 12 shows the entire result, and FIG. 13 shows an enlarged view of the shape of the first flank surface (the flank surface P3*a*) in the region surrounded by the broken line indicated by reference sign A1 shown in FIG. 12. The result shown in FIGS. 12 and 13 is a result obtained when the optical axis of the first illumination unit 1 is inclined at θ1=2°. The horizontal axis in FIG. 12 represents a position of the threaded pipe P in a direction of the pipe axis AX with a certain position as a reference (0 mm), and the vertical axis represents a position of the threaded pipe P in a pipe diameter direction with a certain position as a reference (0 mm).

As shown in FIG. 13, it is found that the shape of the flank surface P3*a* calculated on the basis of the first captured image generated by the imaging unit 3 in the first state matches well with the shape of the first flank surface measured by the contracer, and therefore the shape dimension of the first flank surface can be accurately calculated.

Figure 14:
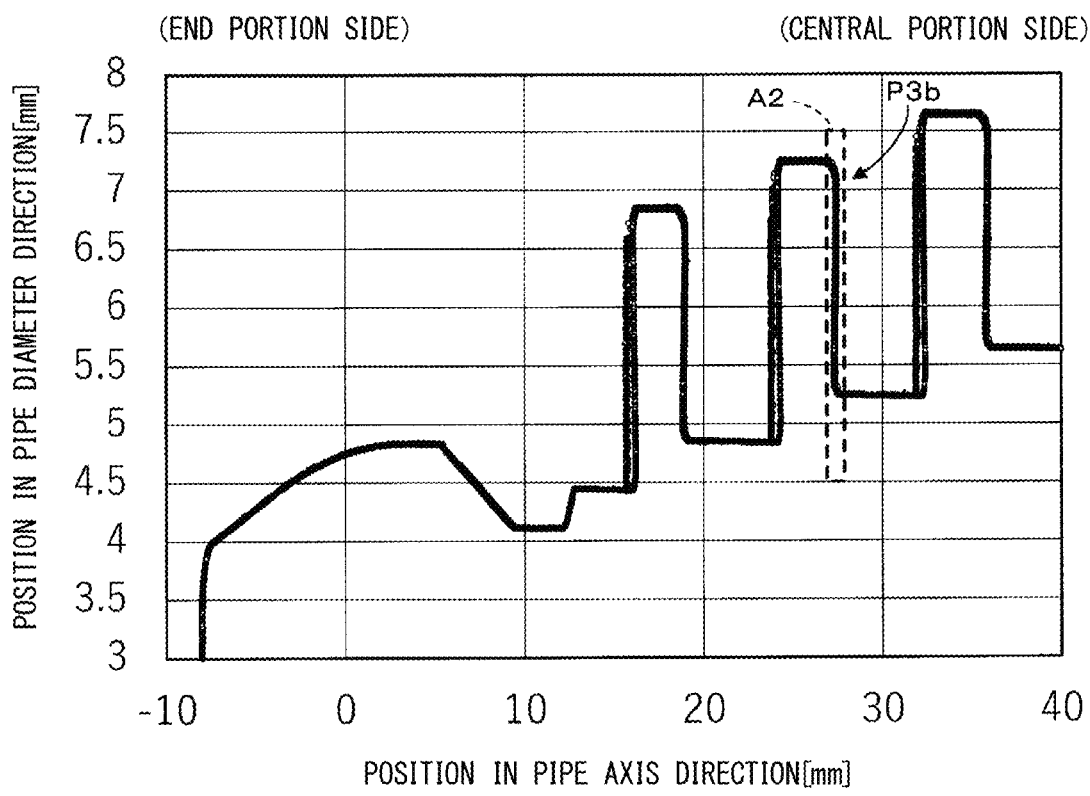
FIG. 14 shows an example of a result in which a result obtained by actually calculating a shape dimension of the second flank surface on the basis of the second captured image generated by the imaging unit in the first state illustrated in FIG. 9(b) is compared with a shape of the second flank surface measured with a contact-type shape dimension measuring device. That is, it is a comparison of the measurement results of the shape dimensions of the threaded portion, and is illustrated in a graph in which the horizontal axis represents a position in a pipe axis direction and the vertical axis represents a position in a pipe diameter direction.
Figure 15:
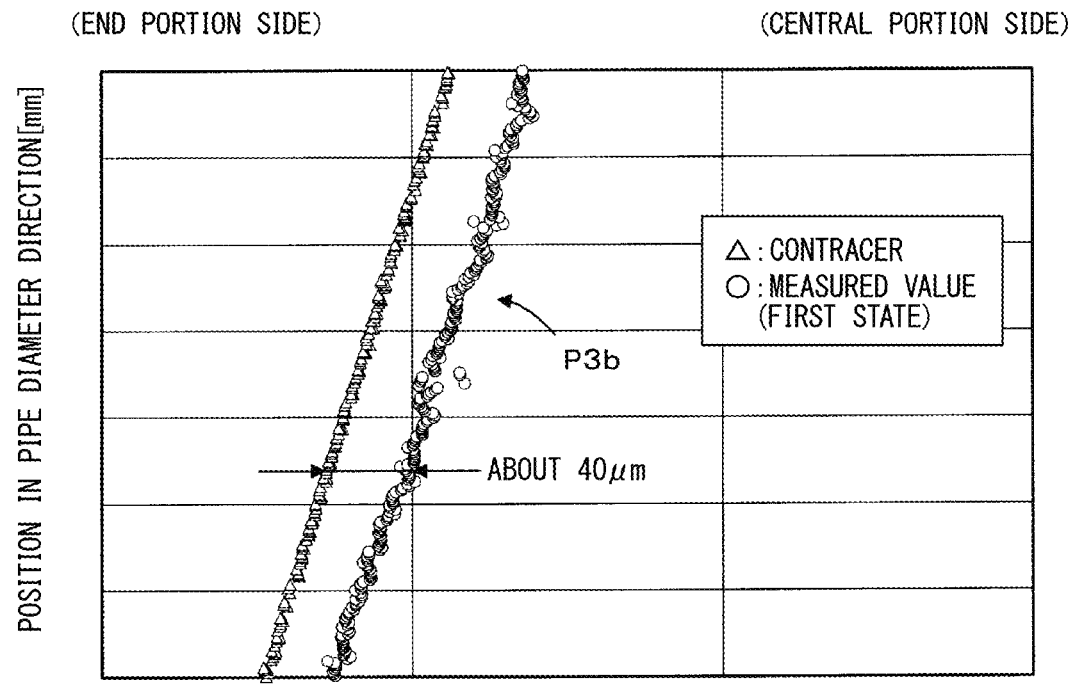
FIG. 15 is an enlarged view of a part A2 in FIG. 14 illustrating the shape dimension of the second flank surface. Here, the horizontal axis represents a position in the pipe axis direction, and the vertical axis represents a position in the pipe diameter direction.

FIGS. 14 and 15 show an example of a result in which a result obtained by actually calculating the shape dimension of the second flank surface (the flank surface P3*b*) on the basis of the second captured image generated by the imaging unit 3 in the first state illustrated in FIG. 9(*b*) is compared with a shape of the second flank surface measured with a contact-type shape dimension measuring device (Mitutoyo contracer, stylus tip angle 20°, tip radius 25 μm). FIG. 14 shows the entire result, and FIG. 15 shows an enlarged view of the shape of the second flank surface (the flank surface P3*b*) in the region surrounded by the broken line indicated by reference sign A2 shown in FIG. 14. The result shown in FIGS. 14 and 15 is a result obtained when the optical axis of the second illumination unit 2 is inclined at θ2=1°. The horizontal axis in FIG. 14 represents a position of the threaded pipe P in the direction of the pipe axis AX with a certain position as a reference (0 mm), and the vertical axis represents a position of the threaded pipe P in a pipe diameter direction with a certain position as a reference (0 mm).

As shown in FIG. 15, it is found that the position of the second flank surface (the flank surface P3*b*) calculated on the basis of the second captured image generated by the imaging unit 3 in the first state is calculated to be deviated by about 40 μm to the central portion side of the threaded pipe P with respect to the position of the second flank surface measured by the contracer.

As described above, in order to solve the problem that the position of the second flank surface is calculated to be deviated in the direction of the pipe axis AX when the shape dimension of the second flank surface is calculated on the basis of the second captured image generated by the imaging unit 3 in the first state, in the thread shape dimension measuring device 100 according to the present embodiment, as described above, when the shape dimension of the second flank surface is calculated, the position (position in the Z direction) of the imaging unit 3 is adjusted by the adjustment unit 4 so that the focusing position of the imaging unit 3 is in the second state of matching the position of the second flank surface on the cross section M, and thereby the second captured image is generated by the imaging unit 3 of the second state.

Figure 16:
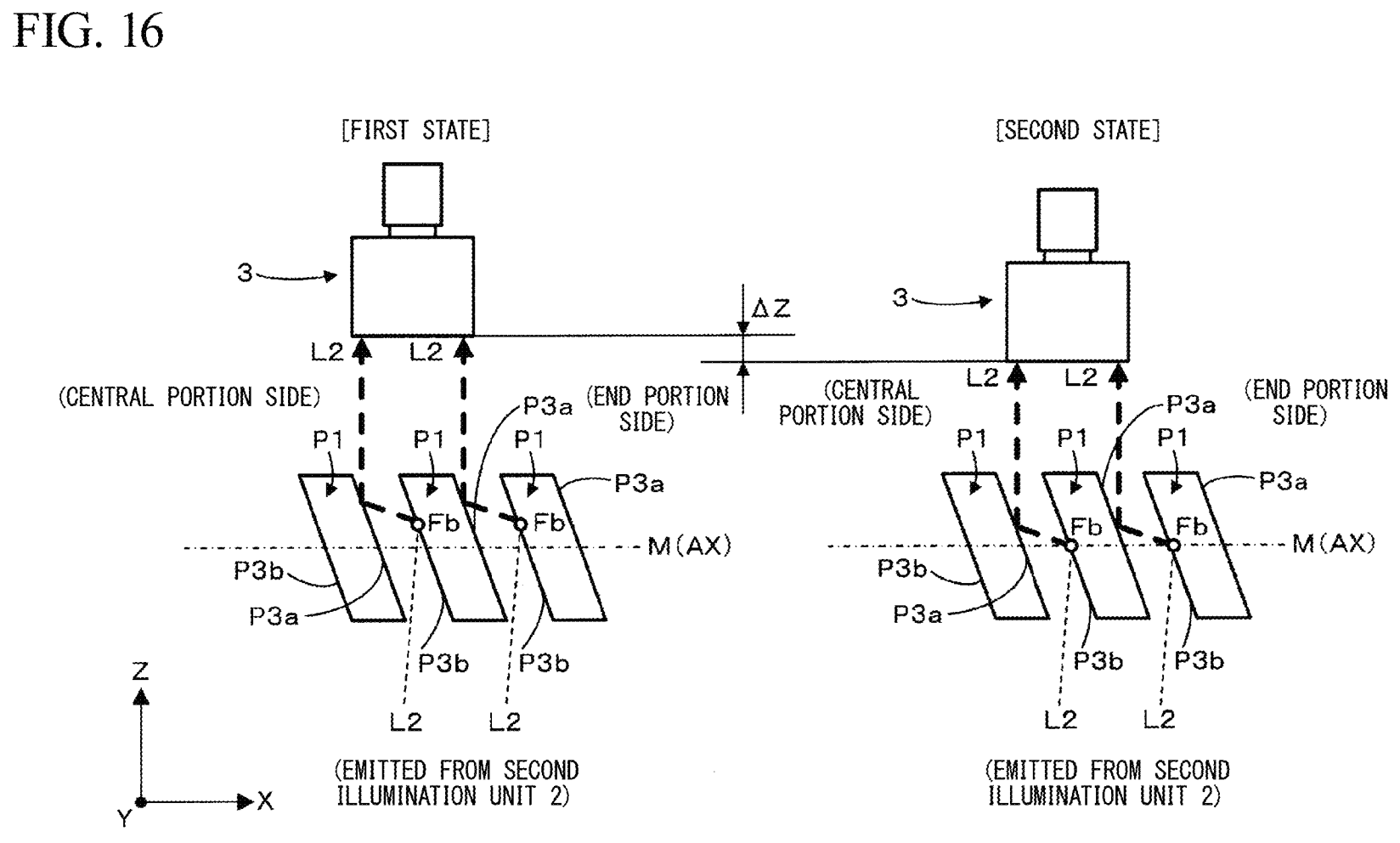
Figure 17:
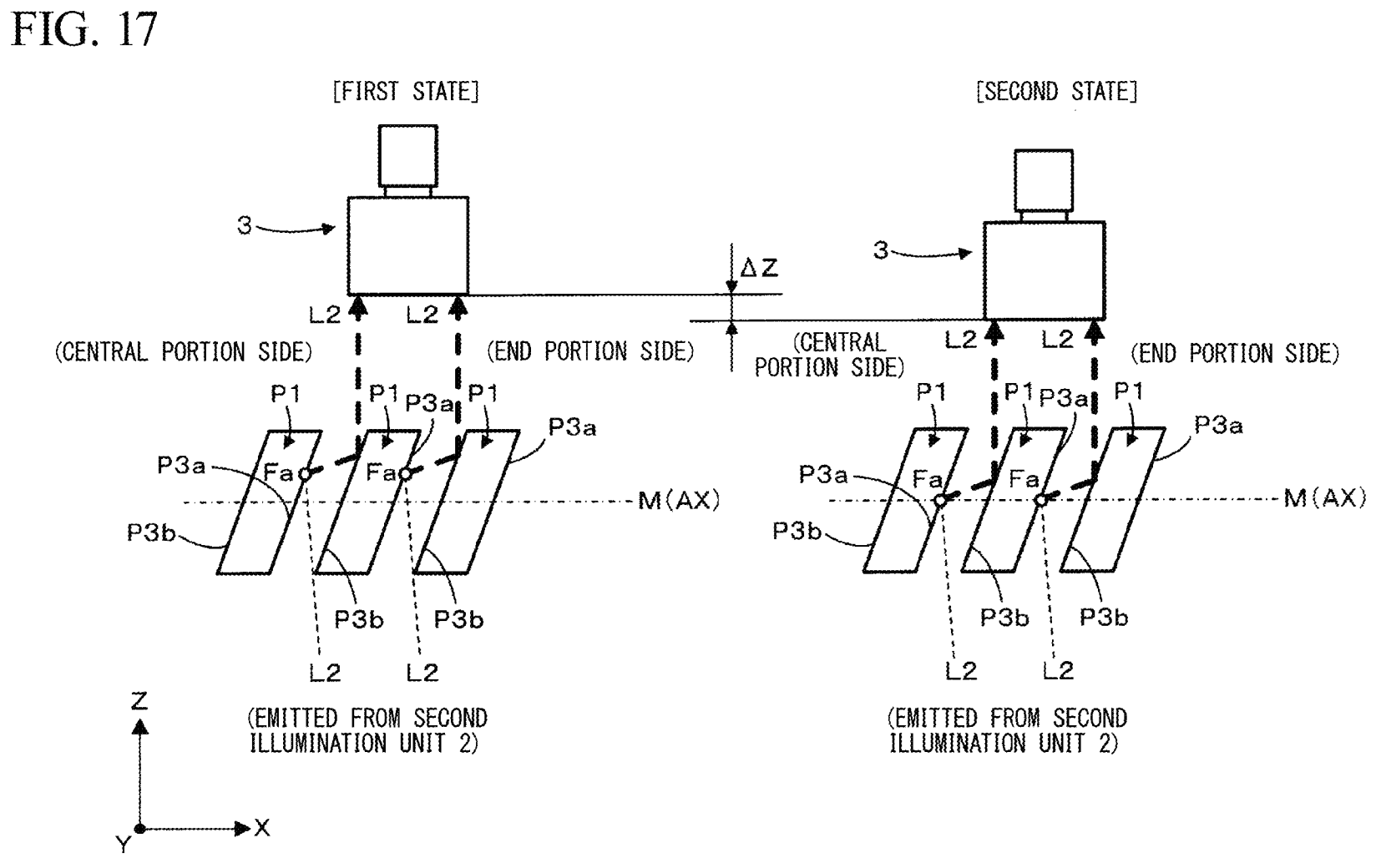

FIGS. 16 and 17 are diagrams schematically illustrating optical paths through which the imaging unit 3 in the first state and the second state receives light when the shape dimension of the second flank surface is calculated.

The left diagram of FIG. 16(*a*) is the same as FIG. 9(*b*), and illustrates an optical path of the parallel light L2 emitted from the second illumination unit 2 until it is detected by the imaging unit 3 when the imaging unit 3 positioned on the right side in FIG. 4 is in the first state.

The right diagram in FIG. 16 illustrates an optical path of the parallel light L2 emitted from the second illumination unit 2 until it is detected by the imaging unit 3 when the position of the imaging unit 3 in the first state illustrated in the left diagram in FIG. 16 is adjusted to be in the second state. As illustrated in the right diagram of FIG. 16, when the imaging unit 3 in the second state is brought closer to the threaded pipe P by the predetermined distance ΔZ (the focusing position Fb approaches the pipe axis AX by the predetermined distance ΔZ) than that in the first state illustrated in the left diagram of FIG. 16, the focusing position Fb of the imaging unit 3 matches the position of the second flank surface (the flank surface P3*b*) on the cross section M. The imaging unit 3 in the second state illustrated in the right diagram in FIG. 16 generates the second captured image by detecting the parallel light L2 emitted from the second illumination unit 2, reflected by the flank surface P3*b* defining a certain thread ridge P1, and further reflected by the first flank surface P3*a* defining an adjacent thread ridge P1, and imaging it at the focusing position Fb. Therefore, the arithmetic processing unit 5 can accurately calculate the shape dimension of the second flank surface (the flank surface P3*b*) on the cross section M on the basis of the second captured image focused at the position of the flank surface P3*b* on the cross section M, and the positional deviation of the calculated second flank surface is reduced.

The left diagram of FIG. 17 is the same as FIG. 10(*b*), and illustrates an optical path of the parallel light L2 emitted from the second illumination unit 2 until it is detected by the imaging unit 3 when the imaging unit 3 positioned on the left side in FIG. 4 is in the first state.

The right diagram in FIG. 17 illustrates an optical path of the parallel light L2 emitted from the second illumination unit 2 until it is detected by the imaging unit 3 when the position of the imaging unit 3 in the first state illustrated in the left diagram in FIG. 17 is adjusted to be in the second state. As illustrated in the right diagram in FIG. 17, when the imaging unit 3 in the second state is brought closer to the threaded pipe P by the predetermined distance ΔZ (the focusing position Fa approaches the pipe axis AX by the predetermined distance ΔZ) than that in the first state illustrated in the left diagram of FIG. 17, the focusing position Fa of the imaging unit 3 matches the position of the second flank surface (the flank surface P3*a*) on the cross section M. The imaging unit 3 in the second state illustrated in the right diagram in FIG. 17 generates the second captured image by detecting the parallel light L2 emitted from the second illumination unit 2, reflected by the flank surface P3*a* defining a certain thread ridge P1, and further reflected by the first flank surface P3*b* defining an adjacent thread ridge P1, and imaging it at the focusing position Fa. Therefore, the arithmetic processing unit 5 can accurately calculate the shape dimension of the second flank surface (the flank surface P3*a*) on the cross section M on the basis of the second captured image focused at the position of the first flank surface P3*a* on the cross section M, and the positional deviation of the calculated second flank surface is reduced.

Further, the predetermined distance ΔZ may be determined on the basis of, for example, the amount of deviation between the true position of the second flank surface in the direction of the pipe axis AX (for example, the position of the second flank surface measured by the contracer) and the position of the second flank surface in the direction of the pipe axis AX calculated on the basis of the second captured image generated by the imaging unit 3 in the first state. Specifically, if the above-described amount of deviation is ΔX (mm), the predetermined distance ΔZ (mm) can be geometrically determined by the following expression (1) using an amount of deviation ΔX (mm) and the lead angle γ (°).

$$\Delta Z = \Delta X / \tan \gamma \tag{1}$$

In the example shown in FIG. 15 described above, since ΔX≈0.040 mm, ΔZ≈3 mm from the above-described expression (1) when, for example, the lead angle γ=0.76°.

Figure 18:
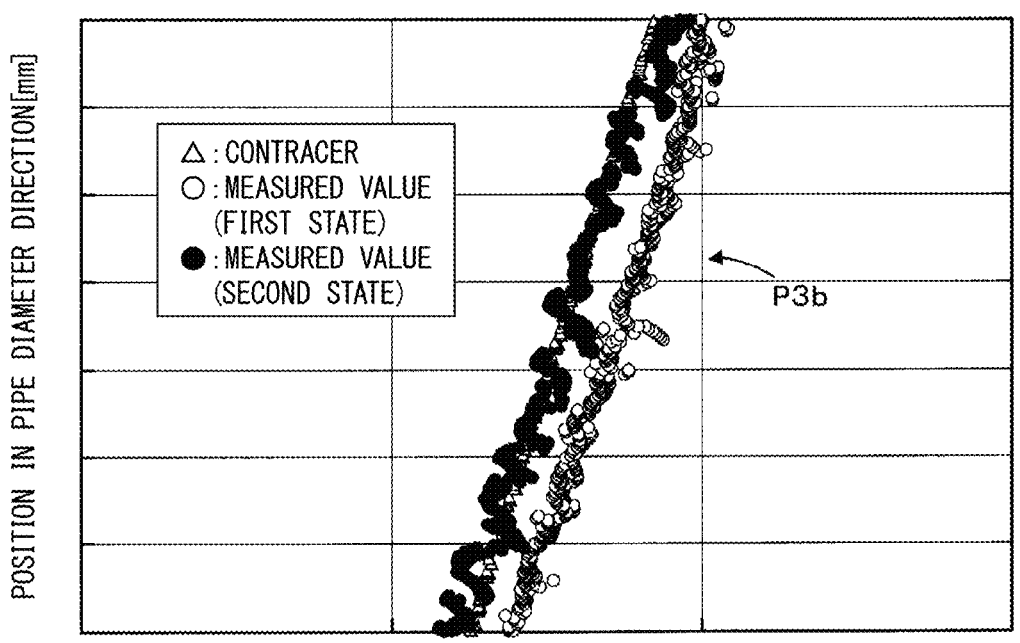
FIG. 18 shows an example of a result in which a result obtained by actually calculating the shape dimension of the second flank surface on the basis of the second captured image generated by the imaging unit in the first state illustrated in the left diagram of FIG. 16 and a result obtained by actually calculating the shape dimension of the second flank surface on the basis of the second captured image generated by the imaging unit in the second state illustrated in the right diagram of FIG. 16 are compared with a shape dimension of the second flank surface measured with a contact-type shape dimension measuring device. Here, the horizontal axis represents a position in the pipe axis direction, and the vertical axis represents a position in the pipe diameter direction.

FIG. 18 shows an example of a result in which a result obtained by actually calculating the shape dimension of the second flank surface (the flank surface P3*b*) on the basis of the second captured image generated by the imaging unit 3 in the first state illustrated in the left diagram of FIG. 16 and a result obtained by actually calculating the shape dimension of the second flank surface on the basis of the second captured image generated by the imaging unit 3 in the second state illustrated in the right diagram of FIG. 16 are compared with a shape of the second flank surface measured with a contact-type shape dimension measuring device (Mitutoyo contracer, stylus tip angle 20°, tip radius 25 μm). The result shown in FIG. 18 is a result obtained when the optical axis of the second illumination unit 2 is inclined at θ2=1°. The horizontal axis in FIG. 18 represents a position of the threaded pipe P in a direction of the pipe axis with a certain position as a reference (0 mm), and the vertical axis represents a position of the threaded pipe P in a pipe diameter direction with a certain position as a reference (0 mm).

As shown in FIG. 18, the position (points plotted with "○" in FIG. 18) of the second flank surface (the flank surface P3*b*) calculated on the basis of the second captured image generated by the imaging unit 3 in the first state is calculated to be deviated to the central portion side of the threaded pipe P with respect to the position (points plotted with "Δ" in FIG. 18) of the second flank surface measured by the contracer. In contrast, it is found that the position (points plotted with "•" in FIG. 18) of the second flank surface (the flank surface P3*b*) calculated on the basis of the second captured image generated by the imaging unit 3 in the second state, which has been brought closer to the threaded pipe P by ΔZ=3 mm from that in the first state, matches well with the position of the second flank surface measured by the contracer, and the calculated positional deviation of the second flank surface is reduced.

According to the thread shape dimension measuring device 100 according to the present embodiment described above, since the shape dimensions of both the pair of the flank surfaces P3 can be measured accurately without occurrence of a positional deviation, it is possible to accurately measure the thread shape dimensions such as a thread ridge width w1 and a thread root width w2 which are calculated according to the positions of both the flank surfaces P3.

Further, in addition to the first illumination unit 1 and the second illumination unit 2, it is also possible to provide an illumination unit having an optical axis in a direction orthogonal to the cross section including the pipe axis AX and emitting parallel light to illuminate the end portion of the threaded pipe P similarly to the device described in Patent Document 2, and calculate a shape of a threaded portion (for example, a shape of the top surface P11 of the thread ridge P1 or a shape of a bottom surface P21 of the thread groove P2) other than the flank surface P3 on the basis of a captured image (hereinafter referred to as a third captured image) generated by illuminating the end portion of the threaded pipe P with the illumination unit described above. Then, it is also possible to calculate a shape dimension of the entire threaded portion PS by combining the shape of the flank surface P3 calculated on the basis of the first captured image and the second captured image and the shape dimension of the threaded portion other than the flank surface P3 calculated on the basis of the third captured image.

The outline of the thread shape dimension measuring device 100 described above will be summarized below.

That is, as illustrated in FIG. 2, the thread shape dimension measuring device 100 of the present embodiment measures a thread shape dimension of the threaded portion PS in the threaded pipe P having the threaded portion PS formed at the end portion and on which the pair of flank surfaces P3*a* and P3*b* defining each thread ridge of the threaded portion PS are both formed in an overhanging manner when viewed in the cross section including the pipe axis AX. As illustrated in FIG. 4, the thread shape dimension measuring device 100 includes the illumination unit 200, the imaging unit 3, the adjustment unit (focal distance adjustment unit) 4, and an arithmetic processing unit (calibration value setting unit, control unit) 5.

As illustrated in FIG. 5, the illumination unit 200 is disposed to face the imaging unit 3, and selectively emits parallel light in two directions including a first illumination direction L1, which is one direction, and a second illumination direction L2, which is another direction, with a direction in which the imaging unit 3 is seen from the illumination unit 200 interposed therebetween.

As illustrated in FIG. 5, the imaging unit 3 selectively performs capturing of the first captured image by receiving the parallel light from the first illumination direction L1 and capturing of the second captured image by receiving the parallel light from the second illumination direction L2.

The adjustment unit (focal distance adjustment unit) 4 receives an adjustment instruction from the arithmetic processing unit (control unit) 5 to adjust a focusing position of the imaging unit.

The arithmetic processing unit (calibration value setting unit) 5 has the predetermined distance $\Delta Z$ as a difference value between a focal distance of the second captured image from the focusing position to the imaging unit 3 before the focusing position adjustment and a focal distance of the first captured image from the focusing position to the imaging unit 3.

That is, the arithmetic processing unit (calibration value setting unit) 5 obtains the predetermined distance $\Delta Z$, which is the difference value, on the basis of the amount of deviation $\Delta X$ between the focusing position of the second captured image before the focusing position adjustment and a true focusing position in the direction of the pipe axis AX orthogonal to a direction of connection between the illumination unit 200 and the imaging unit 3.

The arithmetic processing unit (control unit) 5 acquires the difference value, and gives the adjustment instruction to bring the focusing position closer to the illumination unit 200 by the difference value to the adjustment unit (focal distance adjustment unit) 4 when the second captured image is captured. Further, the arithmetic processing unit (control unit) 5 calculates the thread shape dimension on the basis of the captured first captured image and second captured image.

INDUSTRIAL APPLICABILITY

According to each of the above-described aspects of the present invention, it is possible to accurately measure a shape dimension of the flank surface of the threaded pipe on which a pair of flank surfaces defining each thread ridge of the threaded portion are formed in an overhanging manner. Therefore, industrial applicability is high.

BRIEF DESCRIPTION OF THE REFERENCE SYMBOLS

1 First illumination unit
2 Second illumination unit
3 Imaging unit
4 Adjustment unit (focal distance adjustment unit)
5 Arithmetic processing unit (calibration value setting unit, control unit)
31 Imaging unit main body
32 Telecentric lens

100 Thread shape dimension measuring device
200 Illumination unit
AX Pipe axis
M Cross section
P Threaded pipe
P3 Flank surface
P3*a* Flank surface, first flank surface
P3*b* Flank surface, second flank surface
PS Threaded portion
L1, L2 Parallel light
$\Delta Z$ Predetermined distance (difference value)

The invention claimed is:

1. A thread shape dimension measuring method for measuring a thread shape dimension of a threaded portion in a threaded pipe having the threaded portion formed at an end portion and on which a pair of flank surfaces defining each thread ridge of the threaded portion are both formed in an overhanging manner in a view seen in a cross section including a pipe axis, the thread shape dimension measuring method comprising:

a first illumination step of illuminating the end portion by emitting parallel light in a first illumination direction inclined in a direction forming an angle larger than a lead angle of the threaded portion with respect to a direction orthogonal to the cross section including the pipe axis;

a second illumination step of illuminating the end portion by emitting parallel light in a second illumination direction inclined to a side opposite to the lead angle of the threaded portion with respect to a direction orthogonal to the cross section including the pipe axis;

an imaging step of, in an imaging side facing an emitting source of the parallel light with the end portion interposed therebetween, capturing a first captured image of the end portion by receiving light that has passed between thread ridges of the threaded portion from the parallel light emitted in the first illumination direction, and capturing a second captured image of the end portion by receiving light that has passed between thread ridges of the threaded portion from the parallel light emitted in the second illumination direction; and an arithmetic processing step of calculating the thread shape dimension of the threaded portion on the basis of the first captured image and the second captured image, wherein when one of the pair of flank surfaces whose portion on a cross section including the pipe axis is able to be directly imaged from the imaging side is defined as a first flank surface, and one thereof whose portion on the cross section including the pipe axis is not able to be directly imaged from the imaging side is defined as a second flank surface, in the arithmetic processing step, a shape dimension of the first flank surface is calculated on the basis of the first captured image captured in a first state in which a focusing position is adjusted to match a position of the first flank surface on the cross section, and a shape dimension of the second flank surface is calculated on the basis of the second captured image captured in a second state in which a focusing position is brought closer to the pipe axis by a predetermined distance than that in the first state so that the focusing position matches a position of the second flank surface on the cross section.

2. The thread shape dimension measuring method according to claim 1, wherein the predetermined distance is obtained on the basis of an amount of deviation between a true position of the second flank surface in a pipe axis direction and a position of the second flank surface in the pipe axis direction calculated on the basis of the second captured image captured in the first state.

*    *    *    *    *